United States Patent
Hase et al.

(10) Patent No.: US 7,912,379 B2
(45) Date of Patent: *Mar. 22, 2011

(54) OPTICAL TRANSMITTER CIRCUIT

(75) Inventors: Kazutoshi Hase, Osaka (JP); Hiroyuki Sasai, Osaka (JP); Tomoaki Ieda, Osaka (JP)

(73) Assignee: Panasonic Corporation, Osaka (JP)

( * ) Notice: Subject to any disclaimer, the term of this patent is extended or adjusted under 35 U.S.C. 154(b) by 279 days.

This patent is subject to a terminal disclaimer.

(21) Appl. No.: 12/280,076

(22) PCT Filed: Feb. 20, 2007

(86) PCT No.: PCT/JP2007/053462
§ 371 (c)(1),
(2), (4) Date: Aug. 20, 2008

(87) PCT Pub. No.: WO2007/099888
PCT Pub. Date: Sep. 7, 2007

(65) Prior Publication Data
US 2010/0166436 A1    Jul. 1, 2010

(30) Foreign Application Priority Data

Feb. 22, 2006 (JP) .................. 2006-044759
Aug. 1, 2006 (JP) .................. 2006-209655
Nov. 6, 2006 (JP) .................. 2006-300776

(51) Int. Cl.
H04B 10/20 (2006.01)
(52) U.S. Cl. ...... 398/197; 398/193; 398/199; 372/38.02; 315/224; 315/247
(58) Field of Classification Search .................. 398/182, 398/193, 186, 187, 188, 197, 199, 189; 327/514; 372/29.02
See application file for complete search history.

(56) References Cited

U.S. PATENT DOCUMENTS
3,532,904 A * 10/1970 Robinson .................. 327/180
(Continued)

FOREIGN PATENT DOCUMENTS
JP    5-121783    5/1993
(Continued)

OTHER PUBLICATIONS

International Search Report issued Jun. 19, 2007 in the International (PCT) Application of which the present application is the U.S. National Stage.

(Continued)

*Primary Examiner* — Ken N Vanderpuye
*Assistant Examiner* — Danny W Leung
(74) *Attorney, Agent, or Firm* — Wenderoth, Lind & Ponack, L.L.P.

(57) ABSTRACT

A peaking current generating section generates a spire-shaped peaking current that is in synchronism with the transitions of the digital signal, at the rising edge and the falling edge. A light emitting element driving section produces a driving current obtained by combining together a signal amplitude current according to the amplitude of the digital signal and the peaking current. Then, the light emitting element driving section drives a light emitting element by using the driving current. A signal analysis section analyzes the digital signal so as to set a control signal based on the pulse width of the digital signal. A clipping section clips the peaking current of the driving current according to the control signal set by the signal analysis section.

13 Claims, 21 Drawing Sheets

U.S. PATENT DOCUMENTS

| | | | |
|---|---|---|---|
| 4,009,385 A * | 2/1977 | Sell | 372/38.07 |
| 5,402,433 A * | 3/1995 | Stiscia | 372/31 |
| 5,675,609 A * | 10/1997 | Johnson | 375/237 |
| 6,049,175 A * | 4/2000 | Forsberg | 315/200 A |
| 6,285,692 B1 * | 9/2001 | Okayasu | 372/38.02 |
| 6,597,209 B2 * | 7/2003 | Iguchi et al. | 327/108 |
| 7,612,505 B2 * | 11/2009 | Min et al. | 315/291 |
| 7,668,464 B2 * | 2/2010 | Giaretta et al. | 398/135 |
| 2002/0175636 A1 * | 11/2002 | Kawasaka et al. | 315/224 |
| 2002/0181520 A1 * | 12/2002 | Iguchi et al. | 372/38.02 |
| 2003/0104793 A1 * | 6/2003 | Iwasaki | 455/117 |
| 2004/0131362 A1 * | 7/2004 | Giaretta et al. | 398/135 |
| 2007/0171946 A1 * | 7/2007 | Hase et al. | 372/29.02 |
| 2010/0166436 A1 * | 7/2010 | Hase et al. | 398/182 |

FOREIGN PATENT DOCUMENTS

| | | |
|---|---|---|
| JP | 2844682 | 10/1998 |
| JP | 2002-64433 | 2/2002 |

OTHER PUBLICATIONS

Written Opinion of the International Search Authority issued Jun. 19, 2007 in the International (PCT) Application of which the present application is the U.S. National Stage.

* cited by examiner

F I G. 1 5
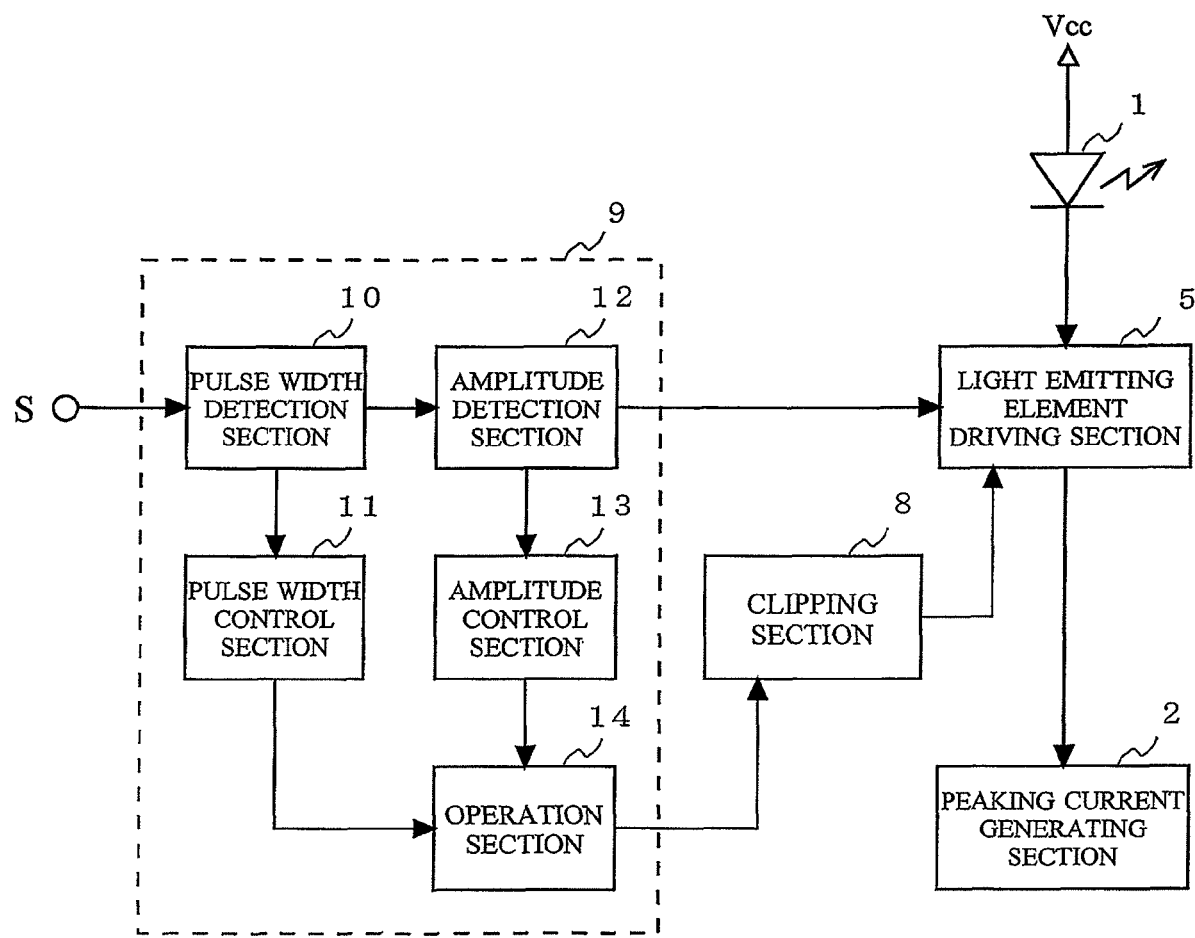

F I G. 1 7
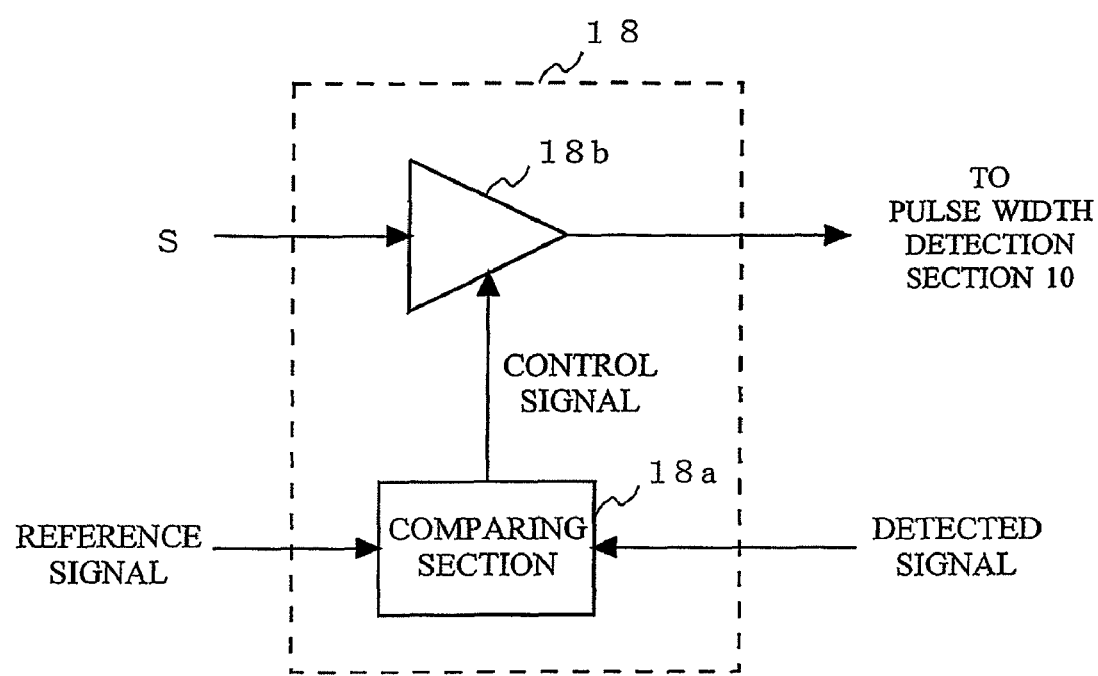

F I G. 2 0
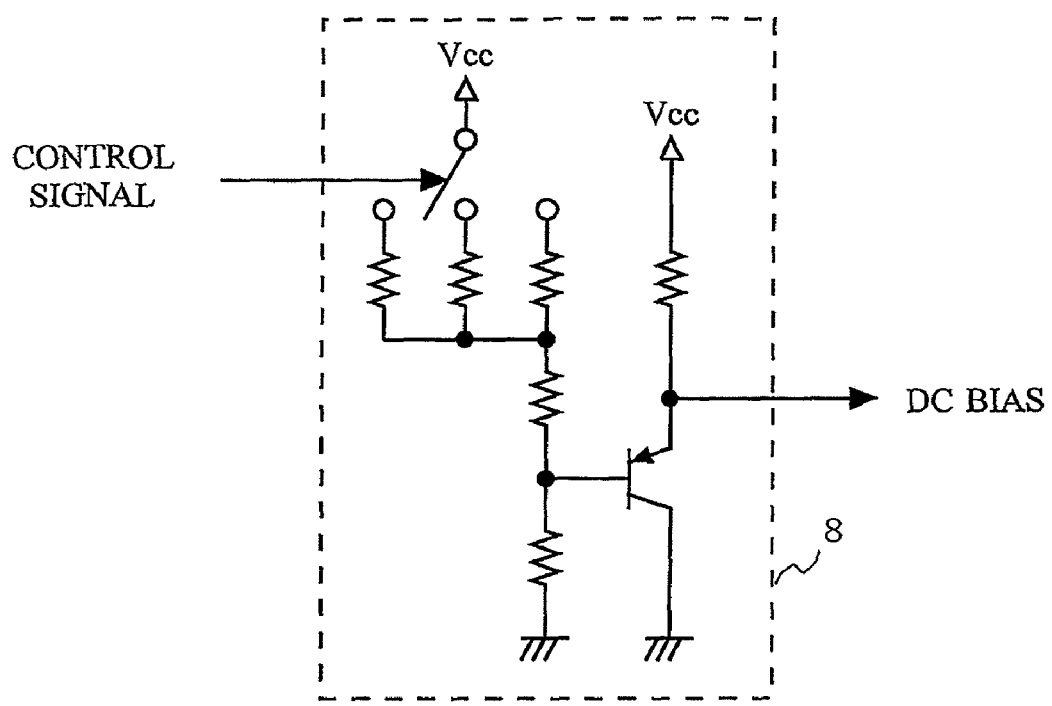

OPTICAL TRANSMITTER CIRCUIT

TECHNICAL FIELD

The present invention relates to an optical transmitter circuit, for use in the field of optical communications, including a circuit capable of driving a light emitting element at a high speed.

BACKGROUND ART

A commonly known type of a driving circuit employs a peaking tecnique for driving, at a high speed, a light emitting element (e.g., an LED) whose response speed is relatively slow. See, for example, Japanese Pat. No. 2844682. With the peaking technique, an instantaneous current (hereinafter referred to as a "peaking current") is given to a light emitting element so as to force the light emitting element to respond at a high speed. FIG. 21 shows an exemplary configuration of a common conventional light emitting element driving circuit using a peaking technique. FIG. 22 shows waveform diagrams illustrating an operation of the conventional light emitting element driving circuit shown in FIG. 21.

The conventional light emitting element driving circuit shown in FIG. 21 includes a light emitting element 101, a peaking current generating section 102, and a light emitting element driving section 103. A digital signal S (the waveform (a) of FIG. 22) is inputted to the light emitting element driving section 103. The peaking current generating section 102 generates a spire-shaped peaking current P (the waveform (b) of FIG. 22) at the rising and falling edges of the digital signal S. The light emitting element driving section 103 receives the digital signal S and the peaking current P, and outputs a driving current D (the waveform (c) of FIG. 22) whose waveform is obtained by combining together an amplitude current according to the amplitude of the digital signal S and the peaking current P. The light emitting element 101 receives the driving current D, and outputs an optical signal (the waveform (d) of FIG. 22) whose waveform substantially matches that of the digital signal S. This is how it is possible to realize a high speed response of the light emitting element 101.

However, the response speed that can be realized with the conventional light emitting element driving circuit described above is on the order of Mbps at best. Realizing a response speed on the order of 100 Mbps or more requires the use of a very large peaking current P, which causes a problem that the reliability of the light emitting element 101 is lowered over a long-term operation, or the like.

SUMMARY OF THE INVENTION

Therefore, an object of the present invention is to provide an optical transmitter circuit which is capable of driving a light emitting element at a high speed with a simple configuration and without lowering the reliability of the light emitting element.

The present invention is directed to an optical transmitter circuit for driving a light emitting element according to a received digital signal. In order to achieve the object set forth above, an optical transmitter circuit of the present invention includes a peaking current generating section, a light emitting element driving section, a signal analysis section, and a clipping section. The peaking current generating section generates a peaking current in synchronism with a rising edge and a falling edge of the digital signal. The light emitting element driving section is provided between the light emitting element and the peaking current generating section, and produces a driving current obtained by combining together a signal amplitude current according to an amplitude of the digital signal and the peaking current, so as to drive the light emitting element by using the driving current. The signal analysis section analyzes the digital signal so as to set a control signal based on at least one of a pulse width and the amplitude of the digital signal. The clipping section clips the peaking current of the driving current according to the control signal set by the signal analysis section.

Preferably, the clipping section sets a ratio of a clipping current amount with respect to the peaking current amount to be less than or equal to a predetermined value. Preferably, the clipping section controls a bias current of the driving current produced by the light emitting element driving section, controls a power supply voltage supplied to the light emitting element, or controls a voltage on a side closer to a terminal of the peaking current generating section to which the light emitting element driving section is not connected.

Typically, the signal analysis section includes a pulse width detection section for detecting a pulse width of the digital signal, and a pulse width control section for setting a control signal according to the detected pulse width. Alternatively, the signal analysis section includes an amplitude detection section for detecting the amplitude of the digital signal, and an amplitude control section for setting a control signal according to the detected amplitude.

Alternatively, the signal analysis section may include the pulse width detection section, the pulse width control section, the amplitude detection section, the amplitude control section, and an operation section for setting, as a control signal, a signal obtained by adding together the signal outputted from the pulse width control section and the signal outputted from the amplitude control section. With such a configuration, the signal analysis section may further include: a light receiving element for receiving an optical signal transmitted from a communication unit with which the optical transmitter circuit is communicating; an amplifier section for amplifying the signal received by the light receiving element; a signal detection section for detecting the amplitude of the signal amplified by the amplifier section; and an amplitude control section for controlling the amplitude of the digital signal inputted to the pulse width detection section based on a detection result of the signal detection section. Instead of using the amplitude control section, the peaking current generating section may be used to control an amount of peaking current to be generated based on a detection result of the signal detection section.

Specifically, the peaking current generating section includes a first resistor and a second resistor connected in series with each other, and a capacitor connected in parallel to the first resistor. Particularly, where the amount of peaking current to be generated is controlled based on the detection result of the signal detection section, it is preferred that the peaking current generating section includes a plurality of blocks, each block including a first resistor and a second resistor connected in series with each other, and a capacitor connected in parallel to the first resistor, and the blocks are switched from one to another based on a detection result of the signal detection section.

The light emitting element may be provided within the optical transmitter circuit, and the light emitting element is preferably an LED.

EFFECT OF THE INVENTION

According to the present invention, the voltage is controlled so that the rising-edge instantaneous current occurring in the peaking current generating section is clipped with a clipping current value that is dependent on a high-level voltage of the digital signal and a voltage set in the clipping section. Thus, it is possible to realize a high-speed response of the light emitting element while preventing the reliability of the light emitting element from lowering over a long-term operation, or the like.

BRIEF DESCRIPTION OF THE DRAWINGS

FIG. 15 shows, in detail, a configuration of an optical transmitter circuit according to a seventh embodiment of the present invention.

FIG. 17 is a detailed circuit diagram of an input signal control section 18.

FIG. 20 is another detailed circuit diagram of a clipping section 8.

DETAILED DESCRIPTION OF THE INVENTION

First Embodiment

Figure 1:
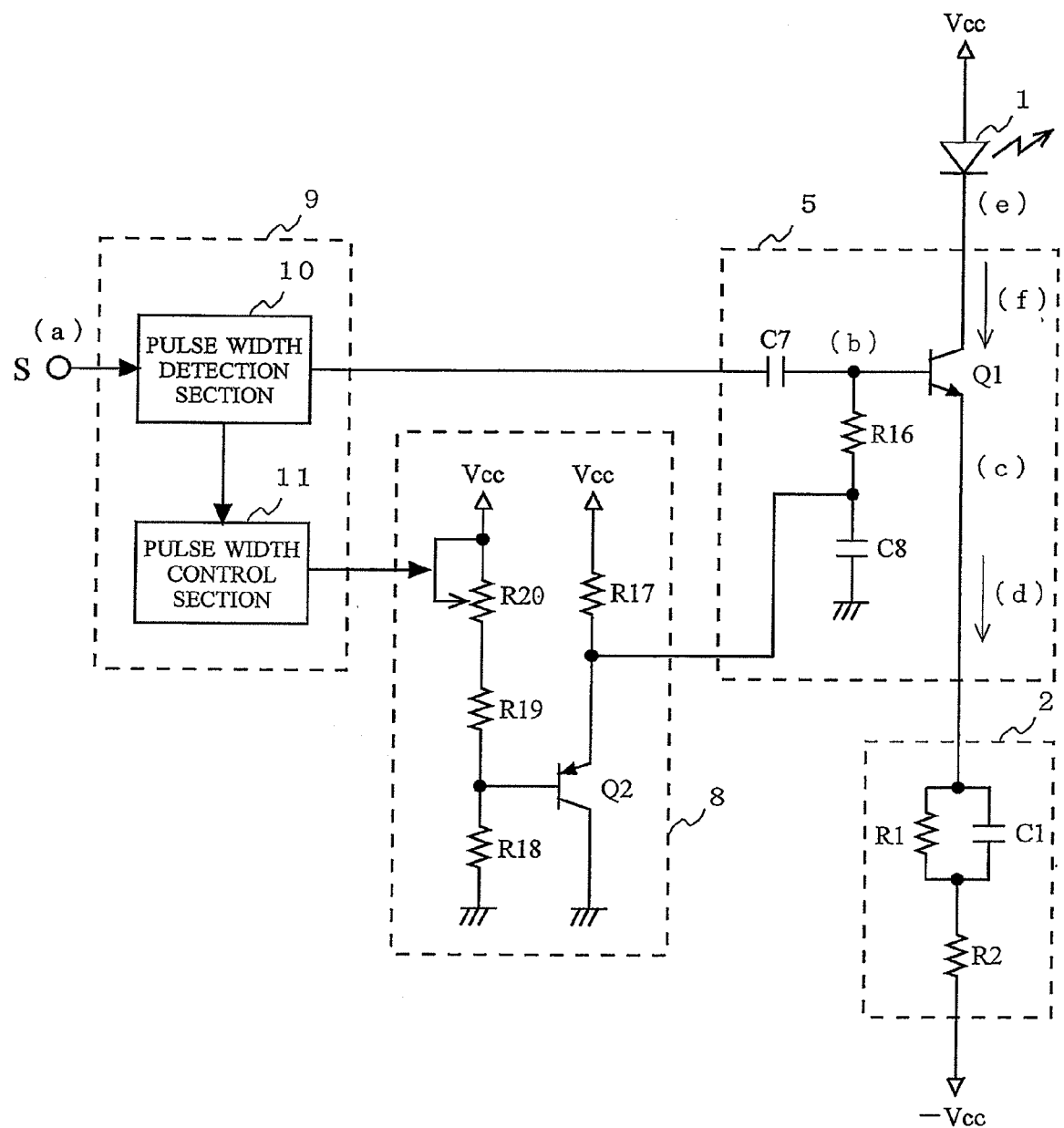
FIG. 1 shows, in detail, a configuration of an optical transmitter circuit according to a first embodiment of the present invention.

FIG. 1 shows a configuration of an optical transmitter circuit according to a first embodiment of the present invention. Referring to FIG. 1, the optical transmitter circuit of the first embodiment includes a light emitting section 1, a peaking current generating section 2, a light emitting element driving section 5, a clipping section 8, and a signal analysis section 9. The signal analysis section 9 includes a pulse width detection section 10 and a pulse width control section 11. The light emitting element 1 may be, for example, a light emitting diode (LED), a laser diode (LD), a superluminescent diode (SLD), or a vertical cavity surface-emitting laser (VCSEL). In the following embodiments, it is assumed that the light emitting element 1 is included in the optical transmitter circuit. However, the light emitting element 1 may be separated from the rest of the circuit in other embodiments.

The light emitting element driving section 5 includes the transistor Q1, a resistor R16, and capacitors C7 and C8. The transistor Q1 may be an NPN-type bipolar transistor, an N-channel field effect transistor, or the like. The base of the transistor Q1 is grounded via the resistor R16 and the capacitor C8 connected in series with each other, and receives a digital signal S via the capacitor C7. The collector of the transistor Q1 is connected to the cathode terminal of the light emitting element 1. The emitter of the transistor Q1 is connected to the peaking current generating section 2. The DC voltage outputted from the clipping section 8 is applied to the connecting point between the resistor R16 and the capacitor C8.

The peaking current generating section 2 includes resistors R1 and R2 and a capacitor C1. The resistor R1 and the resistor R2 are connected in series with each other, and are inserted between the negative power supply −Vcc and the emitter of the transistor Q1 in the light emitting element driving section 5. The capacitor C1 is connected in parallel to the resistor R1. The peaking current generating section 2 generates a spire-shaped peaking current that is in synchronism with the transitions of the digital signal S, being positive at the rising edge and negative at the falling edge.

Figure 2:
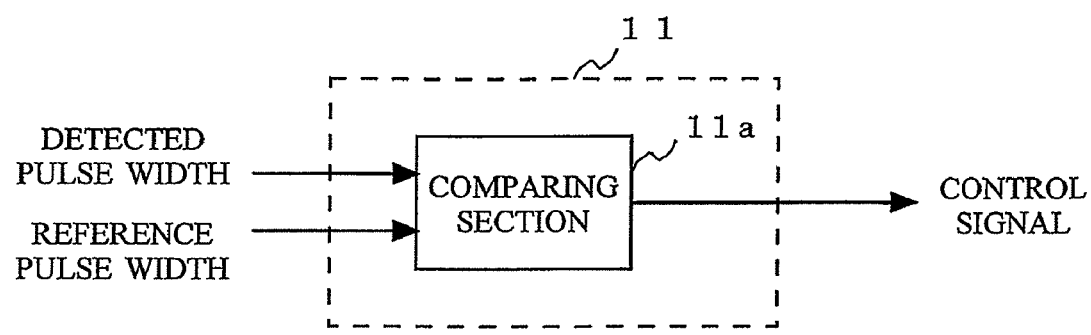
FIG. 2 is a detailed circuit diagram of a pulse width control section 11.

The pulse width detection section 10 outputs the received digital signal S to the light emitting element driving section 5, detects the pulse width of the digital signal S, and outputs the detection result to the pulse width control section 11 as the detected pulse width. The pulse width control section 11 includes a comparing section 11a, for example, as shown in FIG. 2, for comparing a predetermined reference pulse width with the detected pulse width to output a control signal based on the comparison result to the clipping section 8. While an example of the pulse width detection section 10 may be a section for detecting the falling or rising edge of the pulse, any other suitable configuration may be employed. While the comparing section 11a is used as an example of the pulse width detection section 10, there may be provided a memory section storing various control signals so that one of the control signals is read out from the memory section according to the detected pulse width.

The clipping section 8 includes resistors R17 to R19, a variable resistor R20, and a transistor Q2. The transistor Q2 may be a PNP-type bipolar transistor, a P-channel field effect transistor, or the like. The variable resistor R20, the resistor R19, and the resistor R18 are connected in series with one another, and are inserted between the power supply Vcc and GND. The connecting point between the resistor R18 and the resistor R19 is connected to the base of the transistor Q2. The emitter of the transistor Q2 is connected to the power supply Vcc via the resistor R17, and the DC voltage appearing at the emitter is outputted to the connecting point between the resistor R16 and the capacitor C8 of the light emitting element driving section 5. The collector of the transistor Q2 is grounded.

Figure 3:
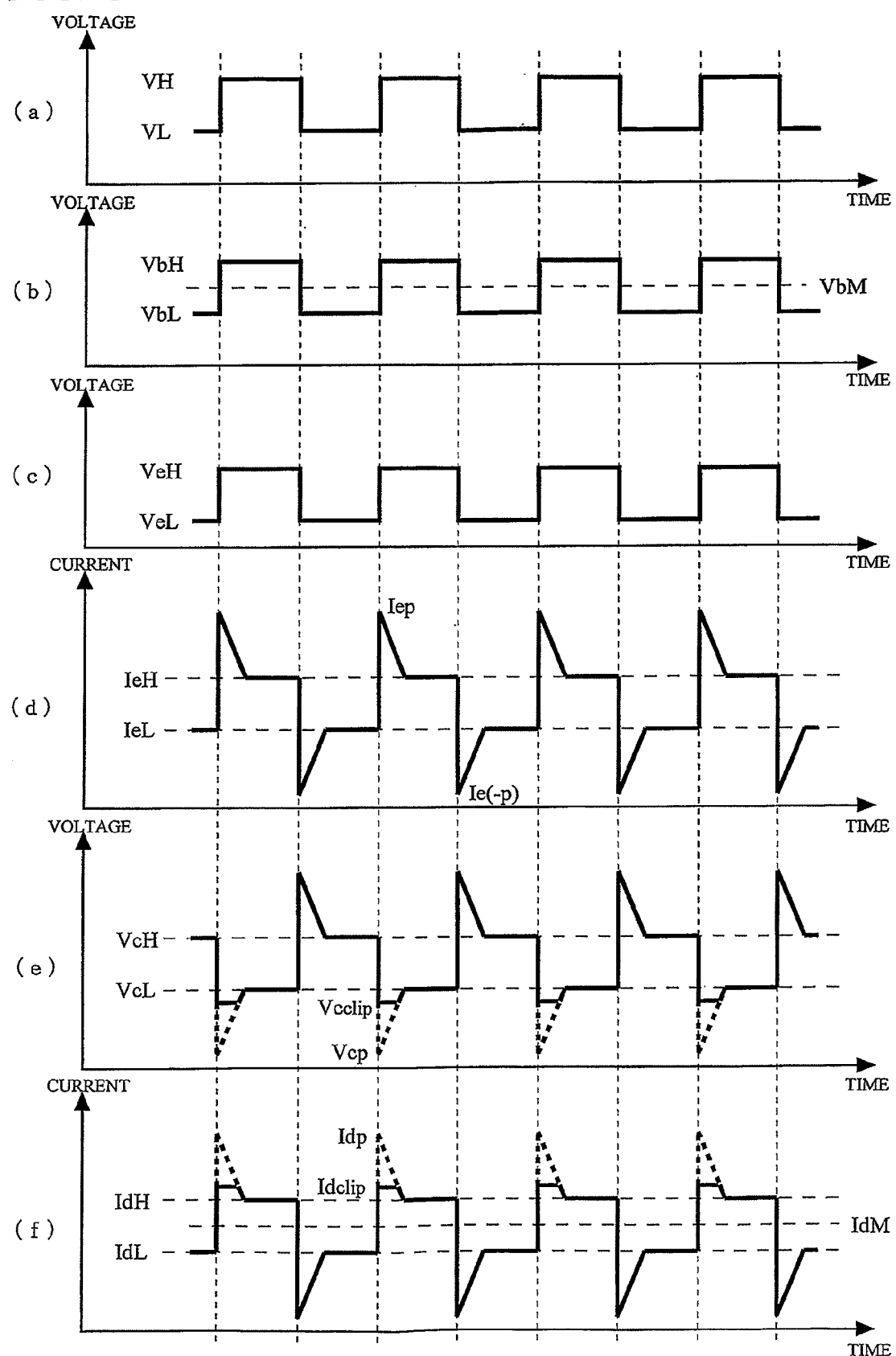
FIG. 3 shows waveform diagrams illustrating an operation of the optical transmitter circuit shown in FIG. 1.
Figure 4:
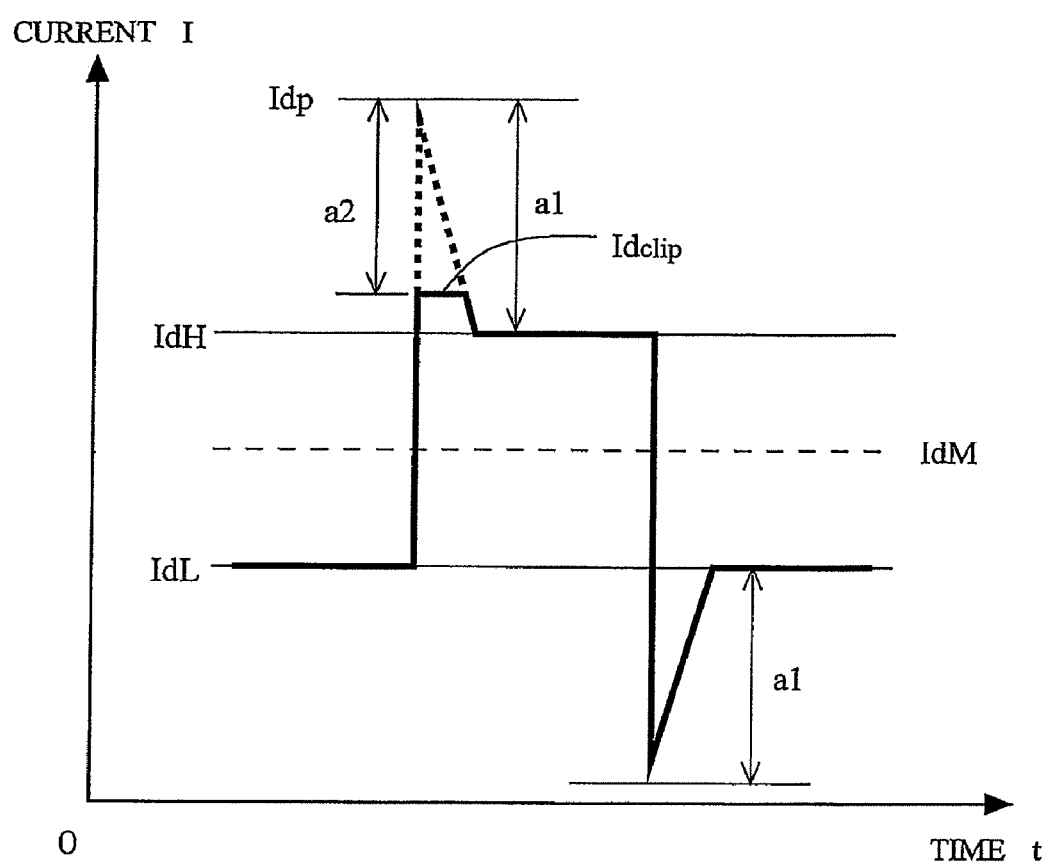
FIG. 4 shows waveform diagrams illustrating an operation of the optical transmitter circuit shown in FIG. 1.

Next, the operation of the optical transmitter circuit of the first embodiment having such a configuration will be described with reference to FIG. 3. FIG. 3 shows waveform diagrams illustrating the operation of the optical transmitter circuit of the first embodiment. FIG. 4 shows, on an enlarged scale, a portion of the waveform (f) of FIG. 3.

The digital signal S (the waveform (a) of FIG. 3) is inputted to the capacitor C7 via the pulse width detection section 10. The digital signal S is a pulse voltage signal having a high-level voltage VH and a low-level voltage VL. The digital signal S is converted, according to a bias voltage generated by the clipping section 8, to a digital signal S' (the waveform (b) of FIG. 3) having an average voltage VbM, a high-level voltage VbH and a low-level voltage VbL, and is inputted to the base of the transistor Q1. Therefore, a high-level voltage VeH and a low-level voltage VeL (the waveform (c) of FIG. 3) appearing at the emitter of the transistor Q1 can be expressed as shown in Expressions 1 and 2 below, respectively.

$$VeH = VbH - VBE \qquad \text{Exp. 1}$$

$$VeL = VbL - VBE \qquad \text{Exp. 2}$$

Herein, VBE is a voltage between the base and the emitter of the transistor Q1.

The current occurring at the emitter of the transistor Q1 (the waveform (d) of FIG. 3) is IeL (=(VeL−(−Vcc))/(R1+R2)) in a steady state of the low-level voltage VeL. Upon the rising transition from the low-level voltage VeL to the high-level voltage VeH, an instantaneous peaking current Iep flows due to charging/discharging of the capacitor C1, and then becomes constant at the high-level voltage VeH. Then, IeH (=(VeH−(−Vcc))/(R1+R2)) flows. Similarly, upon the falling transition from the high-level voltage VeH to the low-level voltage VeL, an instantaneous peaking current Ie (−p) flows, and then returns to the steady state at the low-level voltage VeL. The peaking currents Iep and Ie (−p) can be expressed as shown in Expressions 3 and 4 below, respectively, by using R1, R2, IeH and IeL. Herein, B1 is a constant.

$$Iep = B1 \times (R1/R2) \times (IeH - IeL) + IeH \qquad \text{Exp. 3}$$

$$Ie(-p) = -B1 \times (R1/R2) \times (IeH - IeL) + IeL \qquad \text{Exp. 4}$$

Therefore, the peaking current amount a1 shown in FIG. 4 can be expressed as shown in Expression 5 below.

$$a1 = Iep - IeH = IeL - Ie(-p) = B1 \times (R1/R2) \times (IeH - IeL) \qquad \text{Exp. 5}$$

Figure 5:
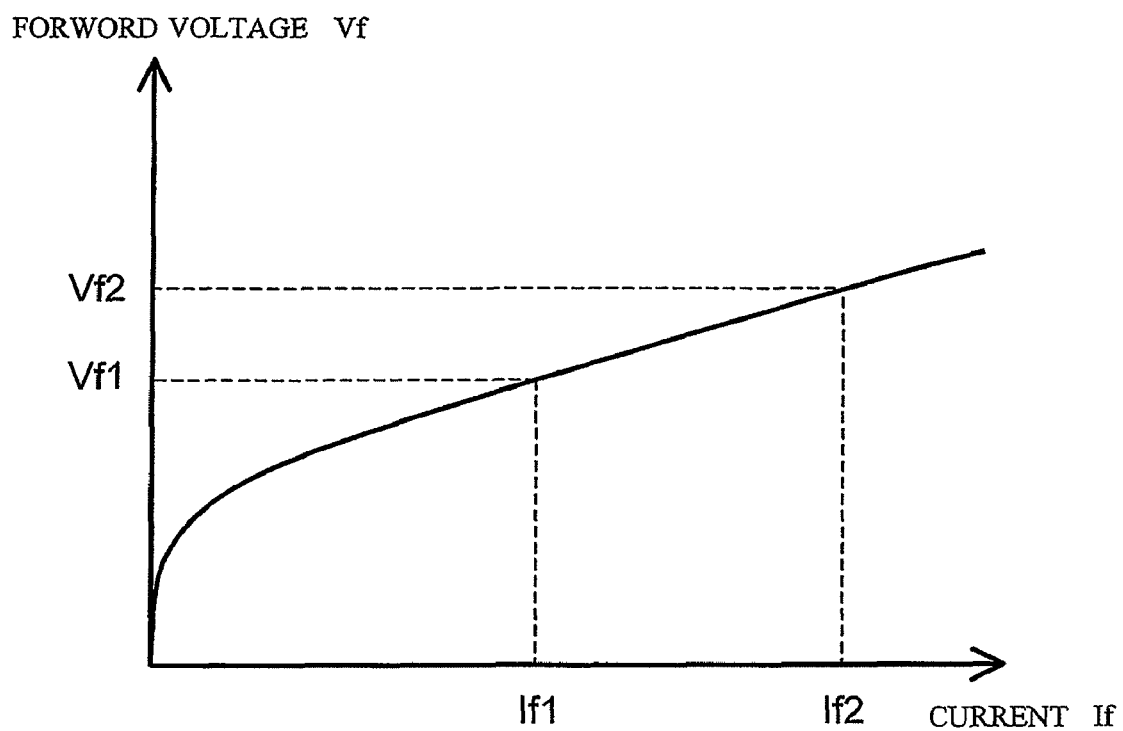
FIG. 5 shows an example of current-voltage characteristics of a light emitting element 1.

A current substantially equal to the emitter current flows through the transistor Q1 as a collector current, and is supplied to the light emitting element 1. However, the light emitting element 1 has current-voltage characteristics as shown in FIG. 5, whereby if there is an increase in the current amount (e.g., from If1 to If2), there is an increase in the forward voltage of the light emitting element 1 (e.g., from Vf1 to Vf2). Therefore, when a rising-edge instantaneous current Iep shown in the waveform (d) of FIG. 3 flows, there will be a very high forward voltage. The collector voltage (the waveform (e) of FIG. 3) can be obtained based on the difference between the power supply voltage Vcc and the forward voltage of the light emitting element 1. Thus, the collector voltage at the rising edge is a voltage Vcp corresponding to the peaking current Iep, which is lower than the steady state at the low-level voltage VcL.

However, since the collector voltage of the transistor Q1 does not become lower than the emitter voltage thereof (the collector-emitter saturation voltage VCE), the rising-edge collector voltage does not become lower than the emitter voltage VeH but becomes constant at Vcclip being substantially equal to the emitter voltage VeH (Vcclip≈VeH).

While the driving currents IdH and IdL of the light emitting element 1 are substantially equal to IeH and IeL, respectively, the rising-edge instantaneous current Idp is a current clipped at the clipping current value Idclip which is expressed as shown in Expression 6 below by using Vcclip, an anode terminal voltage Vcc (in this example) of the light emitting element 1, and a resistance component Rd of the light emitting element 1 (the waveform (f) of FIG. 3).

$$Idclip = (Vcc - Vcclip)/Rd \qquad \text{Exp. 6}$$

Then, the clipping current amount a2 at the rising edge can be expressed as shown in Expression 7 below. The clipping current amount a2 at the falling edge can be expressed as shown in Expression 8 below.

$$a2 = Iep - Idclip \qquad \text{Exp. 7}$$

$$a2 = -Vcc - Ie(-p) \qquad \text{Exp. 8}$$

Thus, it is possible to easily obtain an intended clipping amount by appropriately setting the base voltage VbM supplied from the clipping section 8 to the transistor Q1.

As described above, with the optical transmitter circuit according to the first embodiment of the present invention, it is possible to realize a high-speed response of the light emitting element 1 without lowering the reliability of the light emitting element 1 by adjusting the clipping current amount of rising-edge instantaneous current according to the transmission speed of the digital signal S.

Second Embodiment

Figure 6:
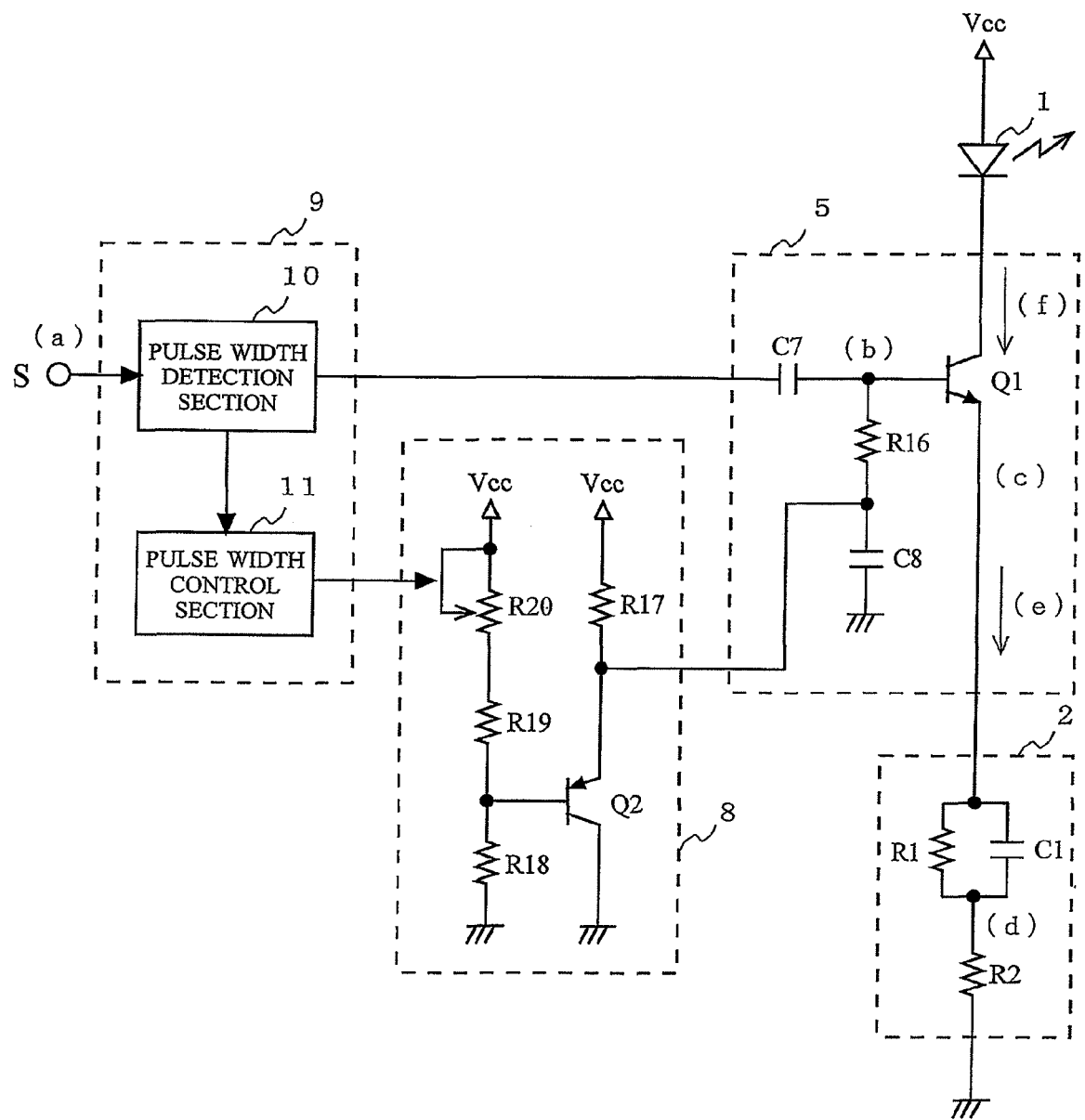
FIG. 6 shows, in detail, a configuration of an optical transmitter circuit according to a second embodiment of the present invention.

FIG. 6 shows a configuration of an optical transmitter circuit according to a second embodiment of the present invention. The optical transmitter circuit of the second embodiment differs from that of the first embodiment in that the potential to which the peaking current generating section 2 is connected is the 0V potential (GND), but not the negative power supply −Vcc.

Figure 7:
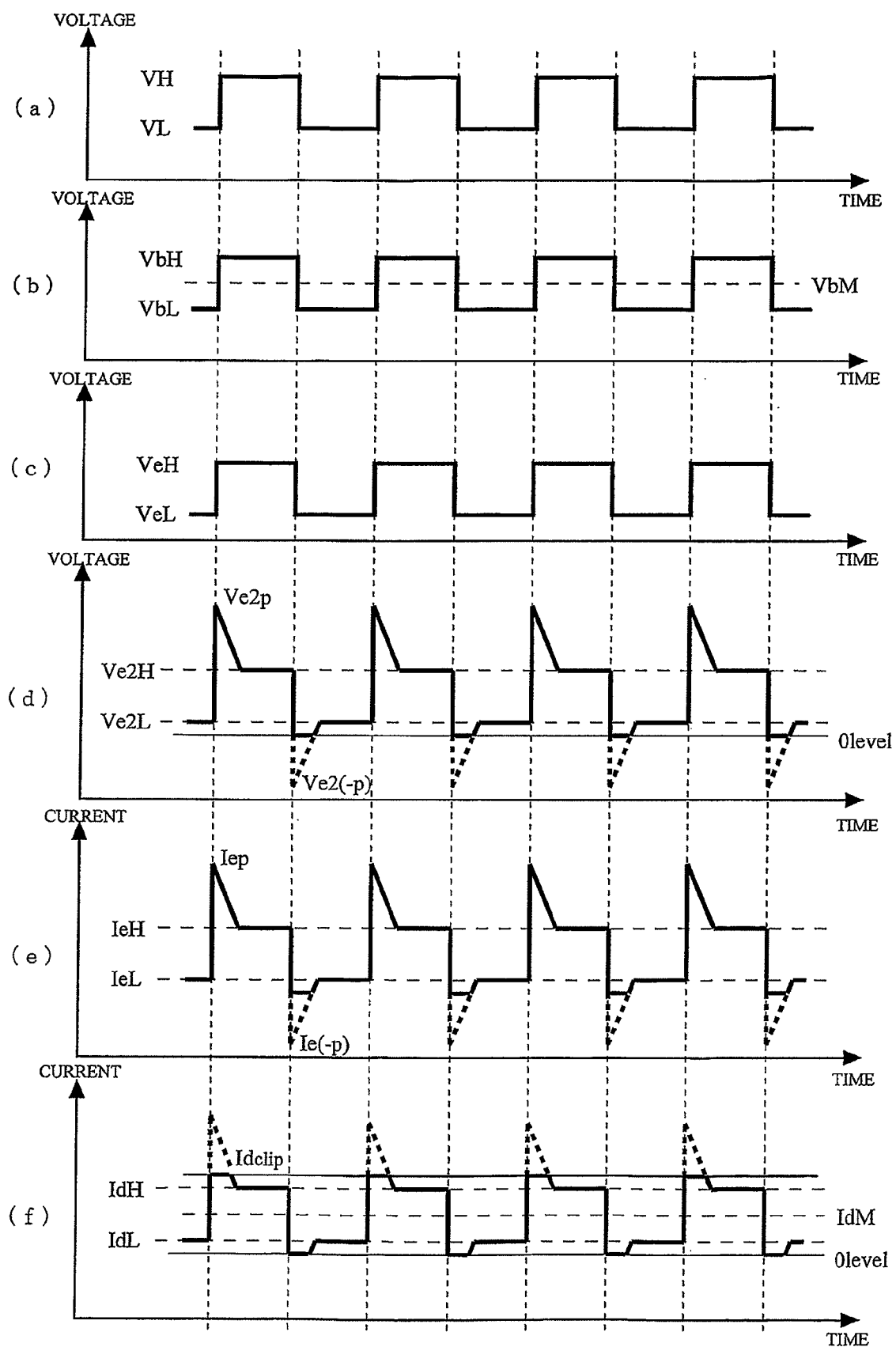
FIG. 7 shows waveform diagrams illustrating an operation of the optical transmitter circuit shown in FIG. 6.
Figure 8:
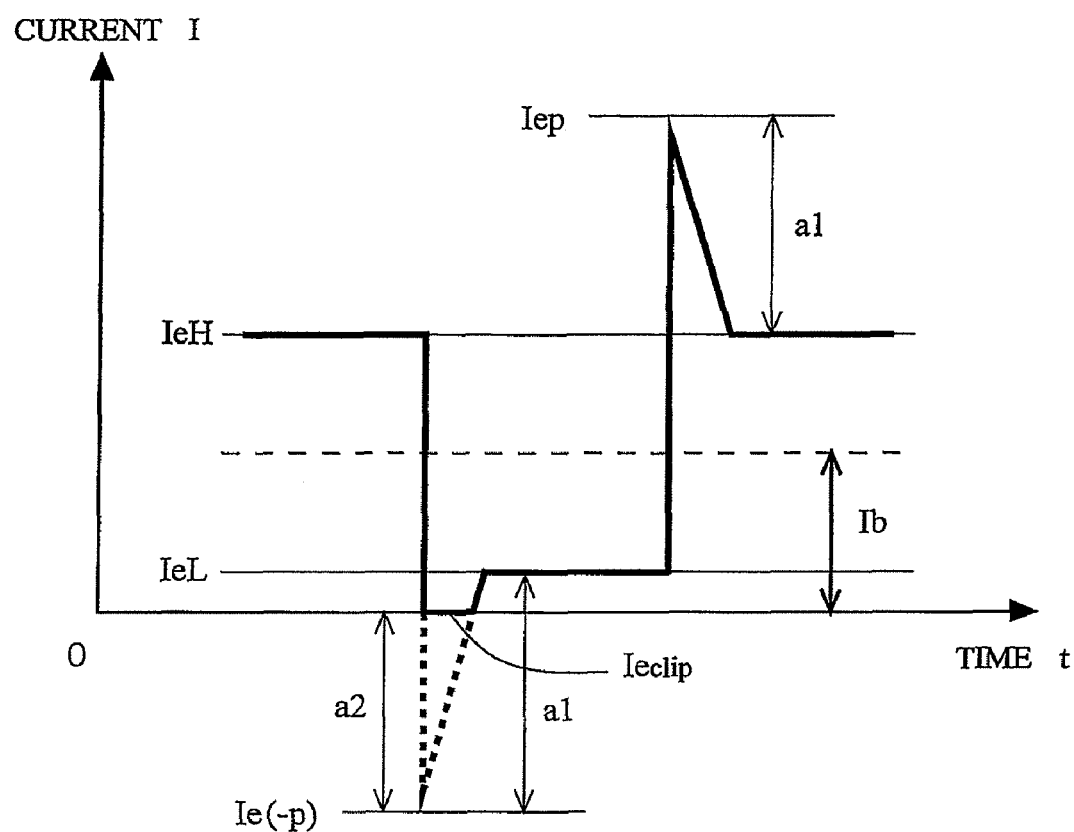
FIG. 8 shows waveform diagrams illustrating an operation of the optical transmitter circuit shown in FIG. 6.

With continued reference to FIGS. 7 and 8, the operation of the optical transmitter circuit of the second embodiment will now be described. FIG. 7 shows waveform diagrams illustrating the operation of the optical transmitter circuit of the second embodiment. FIG. 8 shows, on an enlarged scale, a portion of the waveform (e) of FIG. 7.

The digital signal S (the waveform (a) of FIG. 7) is inputted to the capacitor C7 via the pulse width detection section 10. The digital signal S is converted, according to a bias voltage generated by the clipping section 8, to the digital signal S' (the waveform (b) of FIG. 7) having the average voltage VbM, the high-level voltage VbH and the low-level voltage VbL, and is inputted to the base of the transistor Q1. Then, a voltage waveform which is provided steady state voltages Ve2H and Ve2L obtained in a voltage dividing by the resistors R1 and R2 and instantaneous voltages Ve2p and Ve2 (−p) occurred in the rising-edge and the falling-edge of the digital signal S' is obtained between terminals of the resistor R2 of the peaking current generating section 2. This will now be described below (the waveform (d) of FIG. 7).

As the bias current Ib supplied to the base of the transistor Q1 is decreased, the falling-edge peaking current Ie (−p) decreases below the zero level. In practice, however, clipping occurs in the 0 V potential (GND) (the waveform (d) of FIG. 7), and the peaking current is at the zero level (the waveform (e) of FIG. 7). Thus, with regard to the falling-edge peaking current Ie (−p) where clipping occurs, it is considered that a current equal to the falling-edge peaking current with no clipping is flowing below the zero level. Therefore, the clipping current a2 can be expressed as shown in Expression 9 below.

$$a2=0-\text{Ie}(-p) \quad \text{Exp. 9}$$

As described above, with the optical transmitter circuit according to the second embodiment of the present invention, the potential to which the peaking current generating section 2 is connected is GND, whereby it is possible to easily clip both the rising-edge and falling-edge instantaneous currents.

Third Embodiment

Figure 9:
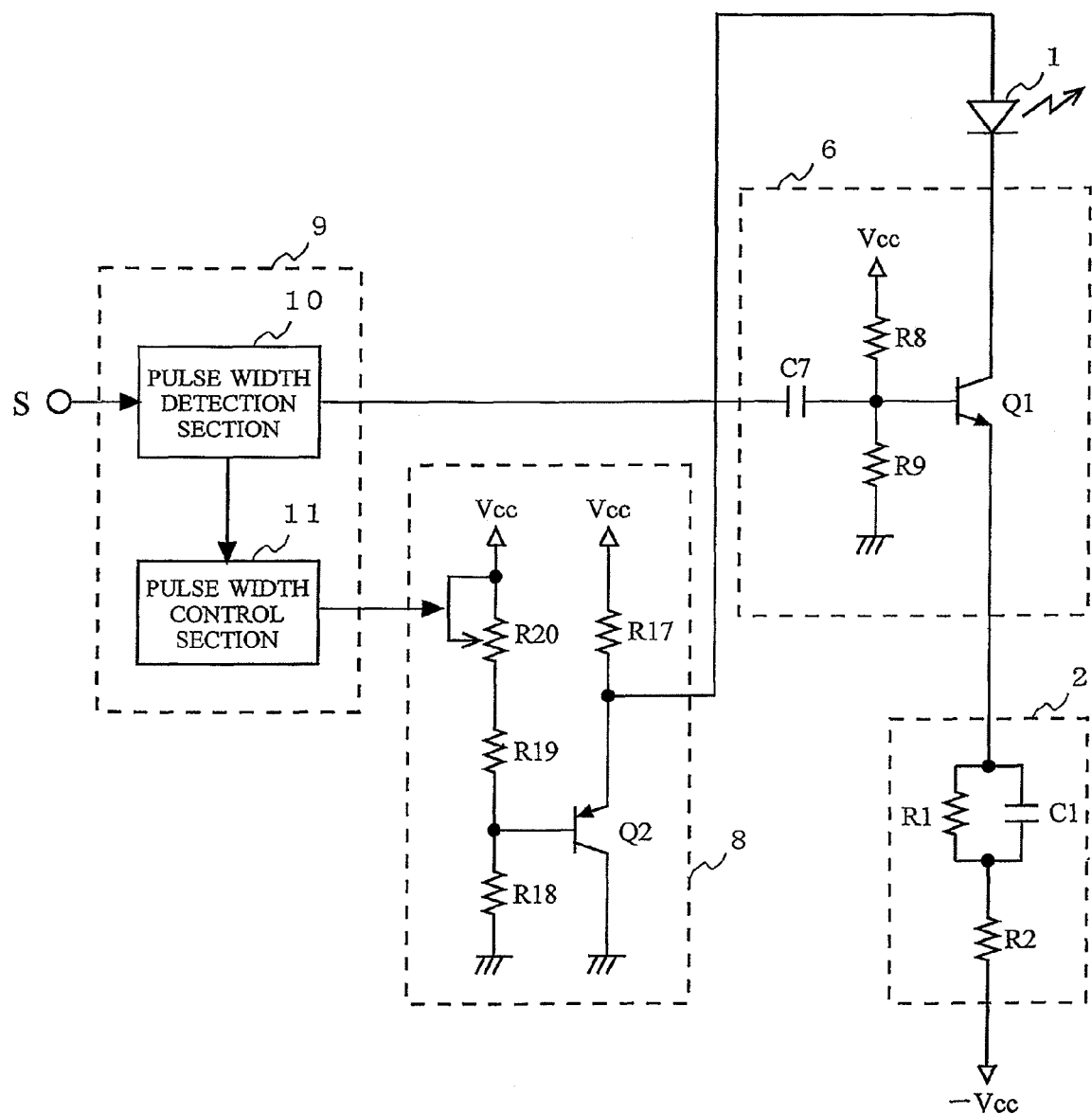
FIG. 9 shows, in detail, a configuration of an optical transmitter circuit according to a third embodiment of the present invention.

FIG. 9 shows a configuration of an optical transmitter circuit according to a third embodiment of the present invention. The third embodiment differs from the first embodiment in the configuration of a light emitting element driving section 6 and the position to which the clipping section 8 is connected. The third embodiment will now be described below while focusing on these configurations different from those of the first embodiment.

The light emitting element driving section 6 includes the transistor Q1, resistors R8 and R9, and the capacitor C7. The transistor Q1 may be an NPN-type bipolar transistor, an N-channel field effect transistor, or the like. The base of the transistor Q1 receives a potential obtained in a voltage dividing by the resistors R8 and R9 connected in series with each other, and the digital signal S via the capacitor C7. The collector of the transistor Q1 is connected to the cathode terminal of the light emitting element 1. The emitter of the transistor Q1 is connected to the negative power supply −Vcc via the peaking current generating section 2. The DC voltage outputted from the clipping section 8 is applied to the anode terminal of the light emitting element 1.

The clipping current value Idclip with which the rising-edge instantaneous current Ip flowing through the light emitting element 1 is clipped is dependent on the anode terminal voltage of the light emitting element 1, as shown in the first embodiment above. Therefore, the clipping current value Idclip can be adjusted by controlling the voltage at the anode terminal of the light emitting element 1.

As described above, with the optical transmitter circuit according to the third embodiment of the present invention, the clipping section 8 is connected to the anode terminal of the light emitting element 1, whereby the clipping amount of the rising-edge instantaneous current can be adjusted by a different configuration.

The emitter of the transistor Q1 may be connected to GND via the peaking current generating section 2.

Fourth Embodiment

Figure 10:
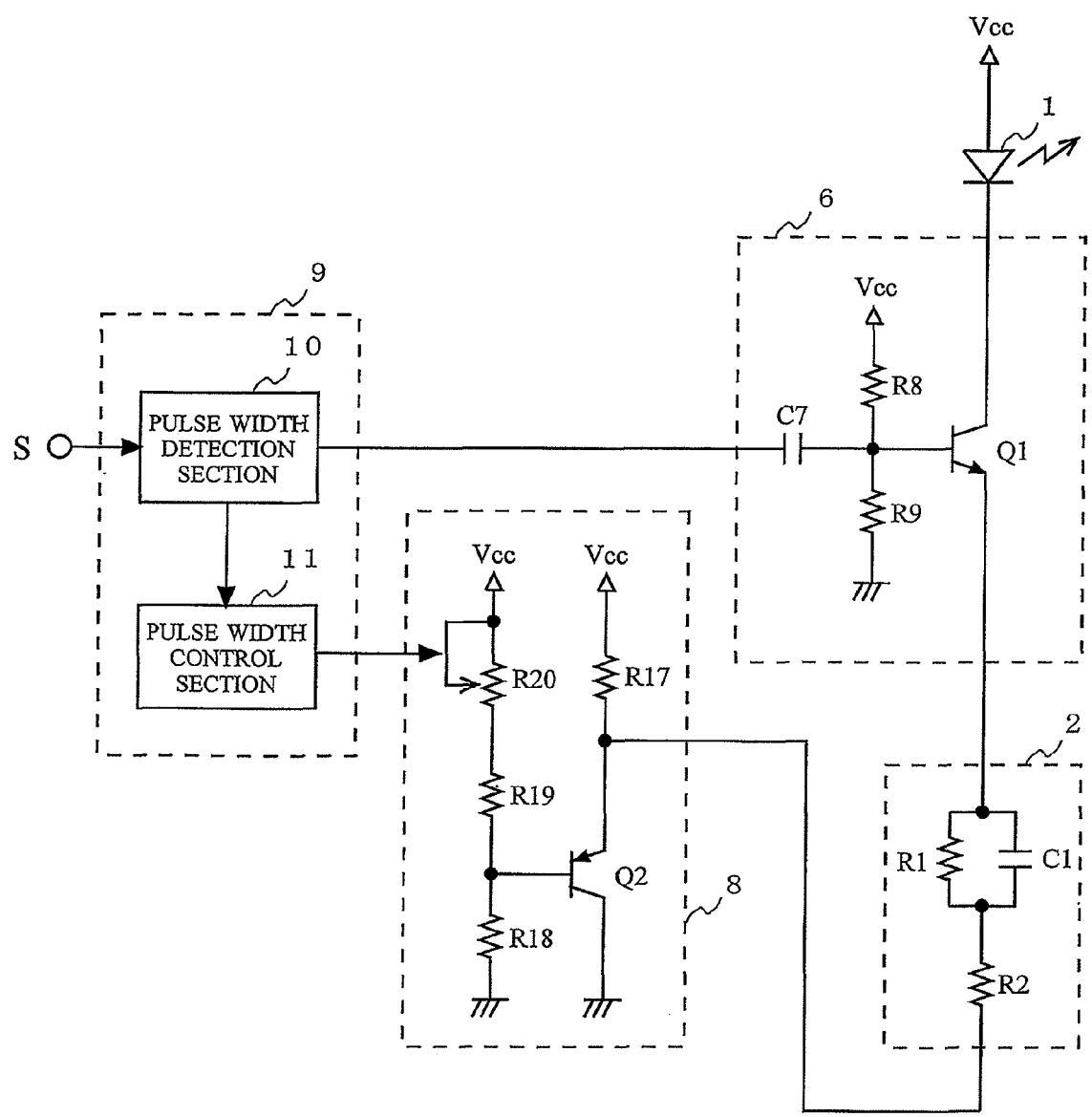
FIG. 10 shows, in detail, a configuration of an optical transmitter circuit according to a fourth embodiment of the present invention.

FIG. 10 shows a configuration of an optical transmitter circuit according to a fourth embodiment of the present invention. The fourth embodiment differs from the third embodiment in the position to which the clipping section 8 is connected. The fourth embodiment will now be described below while focusing on the configuration different from that of the third embodiment.

The collector of the transistor Q1 in the light emitting element driving section 6 is connected to the cathode terminal of the light emitting element 1. The power supply Vcc is applied to the anode terminal of the light emitting element 1. The emitter of the transistor Q1 is connected to the emitter of the transistor Q2 in the clipping section 8 via the peaking current generating section 2.

The rising-edge instantaneous current Iep flowing through the emitter of the transistor Q1 is dependent on the negative power supply −Vcc, being the supply voltage of the peaking current generating section 2, as shown in the first embodiment. Thus, as the supply voltage of the peaking current generating section 2 is controlled, the instantaneous current Iep varies, thereby varying the amount of clipping.

As described above, with the optical transmitter circuit according to the fourth embodiment of the present invention, the clipping section 8 is connected to the emitter of the transistor Q1 via the peaking current generating section 2, whereby the clipping amount of the rising-edge instantaneous current can be adjusted by a different configuration. With this configuration, the clipping amount of the falling-edge instantaneous current can also be adjusted.

Fifth Embodiment

Figure 11:
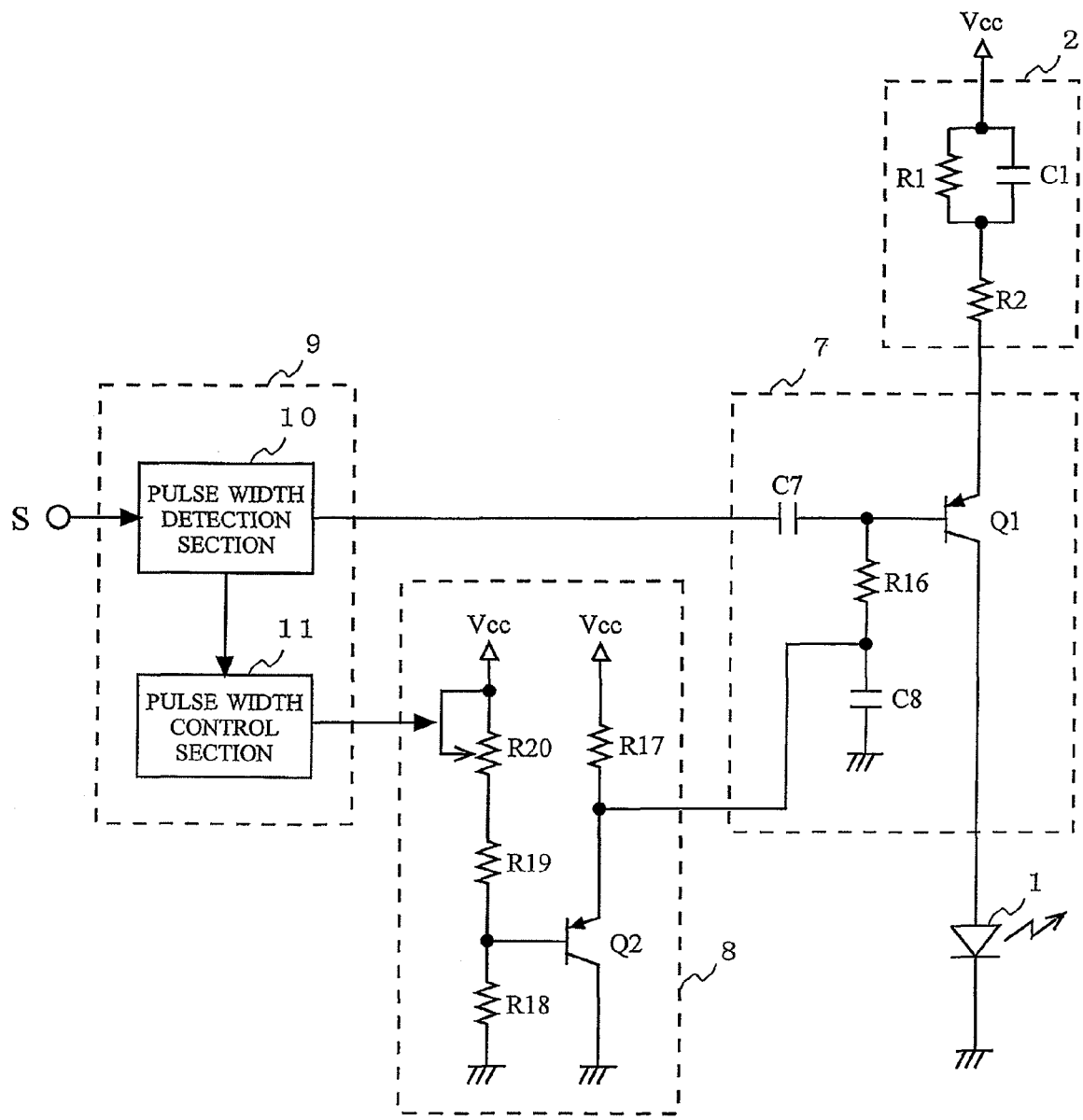
FIG. 11 shows, in detail, a configuration of an optical transmitter circuit according to a fifth embodiment of the present invention.

FIG. 11 shows a configuration of an optical transmitter circuit according to a fifth embodiment of the present invention. Referring to FIG. 11, the optical transmitter circuit of the fifth embodiment includes the light emitting element 1, the peaking current generating section 2, light emitting element driving section 7, the clipping section 8, and a signal analysis section 9. The signal analysis section 9 includes the pulse width detection section 10 and the pulse width control section 11. The third embodiment differs from the first embodiment in the arrangement of the light emitting element 1 and the peaking current generating section 2 and the configuration of the light emitting element driving section 7. The fifth embodiment will now be described while focusing on these configurations different from those of the first embodiment.

A light emitting element driving section 7 includes the transistor Q1, a resistor R16, and capacitors C7 and C8. The transistor Q1 may be a PNP-type bipolar transistor, a P-channel field effect transistor, or the like. The base of the transistor Q1 is grounded via the resistor R16 and the capacitor C8 connected in series with each other, and receives the digital signal S via the capacitor C7. The collector of the transistor Q1 is connected to the anode terminal of the light emitting element 1. The emitter of the transistor Q1 is connected to the peaking current generating section 2. The DC voltage outputted from the clipping section 8 is applied to the connecting point between the resistor R16 and the capacitor C8.

The peaking current generating section 2 includes resistors R1 and R2 and a capacitor C1. The resistor R1 and the resistor R2 are connected in series with each other, and are inserted between the positive power supply Vcc and the emitter of the transistor Q1 in the light emitting element driving section 7. The capacitor C1 is connected in parallel to the resistor R1.

Next, the operation of the optical transmitter circuit of the fifth embodiment having such a configuration will be described.

The digital signal S is inputted to the capacitor C7 via the pulse width detection section 10. The digital signal S is converted, according to a bias voltage generated by the clipping section 8, to the digital signal S' having the average voltage VbM, the high-level voltage VbH and the low-level voltage VbL, and is inputted to the base of the transistor Q1. Thus, the high-level voltage VeH and the low-level voltage VeL appearing at the emitter of the transistor Q1 can be expressed as shown in Expressions 10 and 11, respectively.

VeH=VbH+VBE  Exp. 10

VeL=VbL+VBE  Exp. 11

The current occurring at the emitter of the transistor Q1 is IeL (=(Vcc−VeH)/(R1+R2)) in a steady state of the high-level voltage VeH. Upon the falling transition from the high-level voltage VeH to the low-level voltage VeL, an instantaneous current Iep flows due to charging/discharging of the capacitor C1, and then becomes constant at the low-level voltage VeL. Then, IeH (=(Vcc-VeL)/(R1+R2)) flows. Similarly, upon the raising transition from the low-level voltage VeL to the high-level voltage VeH, an instantaneous current Ie (−p) flows, and then returns to the steady state at the high-level voltage VeH. Herein, Iep and Ie (−p) can be expressed as shown in Expressions 3 and 4 above, respectively. The peaking current amount a1 and the clipping current amount a2 can be expressed as shown in Expressions 5 and 9 above, respectively.

For example, where the light emitting element 1 is driven with a transmission speed of 500 Mbps and a pulse current amplitude (=IeH−IeL) of 14.4 mApp, the bias current Ib required for the condition (a2/a1=0) under which clipping does not occur is experimentally 139.5 mA, and B1×(R1/R2)= 9.15. The rising-edge peaking current Iep and the falling-edge peaking current Ie (−p) are 278.4 mA and 0 mA based on Expressions 3 and 4, respectively. When the bias current Ib is gradually decreased from the condition under which clipping does not occur, clipping occurs, and the output waveform of the light emitting element 1 becomes deteriorated. Then, the value of a2/a1 at which the fall time tf is 1 ns (equivalent to a transmission speed of 500 Mbps) is determined to be about 0.8. Under the condition where the a2/a1=0.8, the bias current Ib is 36.6 mA, whereby the power consumption can be reduced by about 75% compared with a case where clipping does not occur. Other values are as follows: IeP=175.5 mA, Ieclip=0 mA (Ie (−p)=−102.9 mA), a1=131.7 mA, and a2=102.9 mA.

Figure 12:
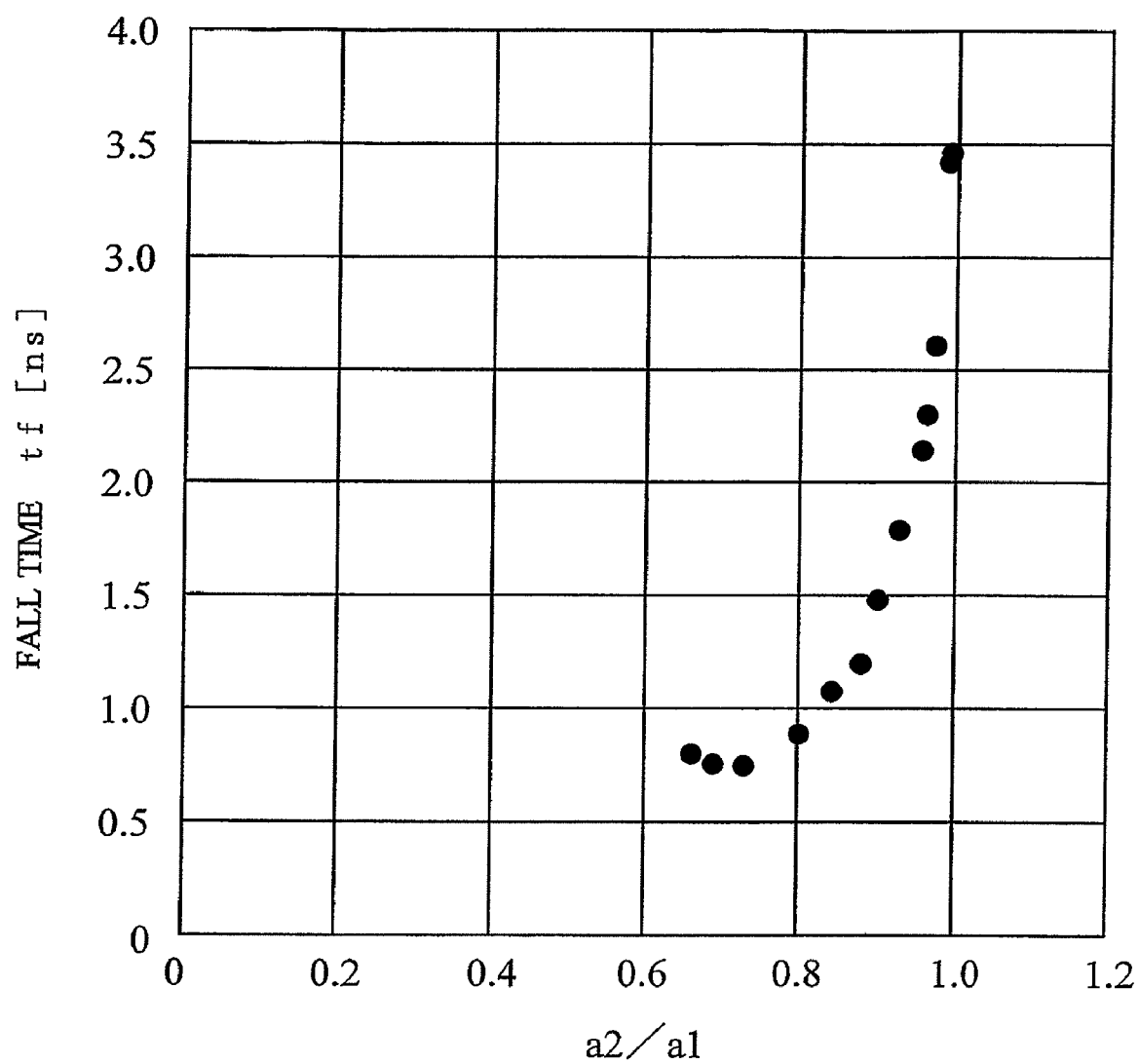
FIG. 12 shows the relationship between a clipping current and a fall time of an optical transmitter circuit shown in FIG. 11.

FIG. 12 shows experimental results for the fall time tf when a2/a1 (i.e., the ratio between the peaking current amount a1 and the clipping current amount a2) was varied with the pulse current amplitude (=IeH−IeL) and the bias current Ib being parameters. The greater the fall time tf is, the lower the response speed is. Where the transmission speed is 500 Mbps with the fall time tf being ins, a high response speed of 500 Mbps can be realized by setting a2/a1 to satisfy Expression 12 below.

0<a2/a1≤0.8  Exp. 12

FIG. 12 can be represented by Expression 13 below. With regard to the time tf, the fall time of the pulse determined by the peaking current (the first term) is dominant when a2/a1 is small, and the fall time determined by clipping current outputted from the light emitting element driving section 7 (the second term) is dominant when a2/a1 is large. In Expression 13, A1, A2, N1 and N2 are constants. The time constant τ1 in the first term is determined by the transient response of the peaking current set by the resistors R1 and R2 and the capacitor C1 of the peaking current generating section 2, and the second time constant τ2 is determined by the transient response of the transistor Q1 and the light emitting element 1 of the light emitting element driving section 7. Thus, a2/a1 can be set according to the transmission speed.

$$tf = -A_1 \cdot \tau_1 \cdot \ln\left\{1 - N_1\left(1 - \frac{a_2}{a_1}\right)\right\} - A_2 \cdot \tau_2 \cdot \ln\left(1 - N_2 \cdot \frac{a_2}{a_1}\right) \quad \text{Exp. 13}$$

As described above, with the optical transmitter circuit according to the fifth embodiment of the present invention, it is possible to automatically adjust the amount of clipping so that the ratio of the clipping current amount with respect to the peaking current amount is less than or equal to a predetermined value, according to the transmission speed of the digital signal S, thus arriving at the minimum amount of clipping for the transmission speed. Thus, it is possible to realize a high response speed of the light emitting element 1 while reducing the power consumption.

Sixth Embodiment

Figure 13:
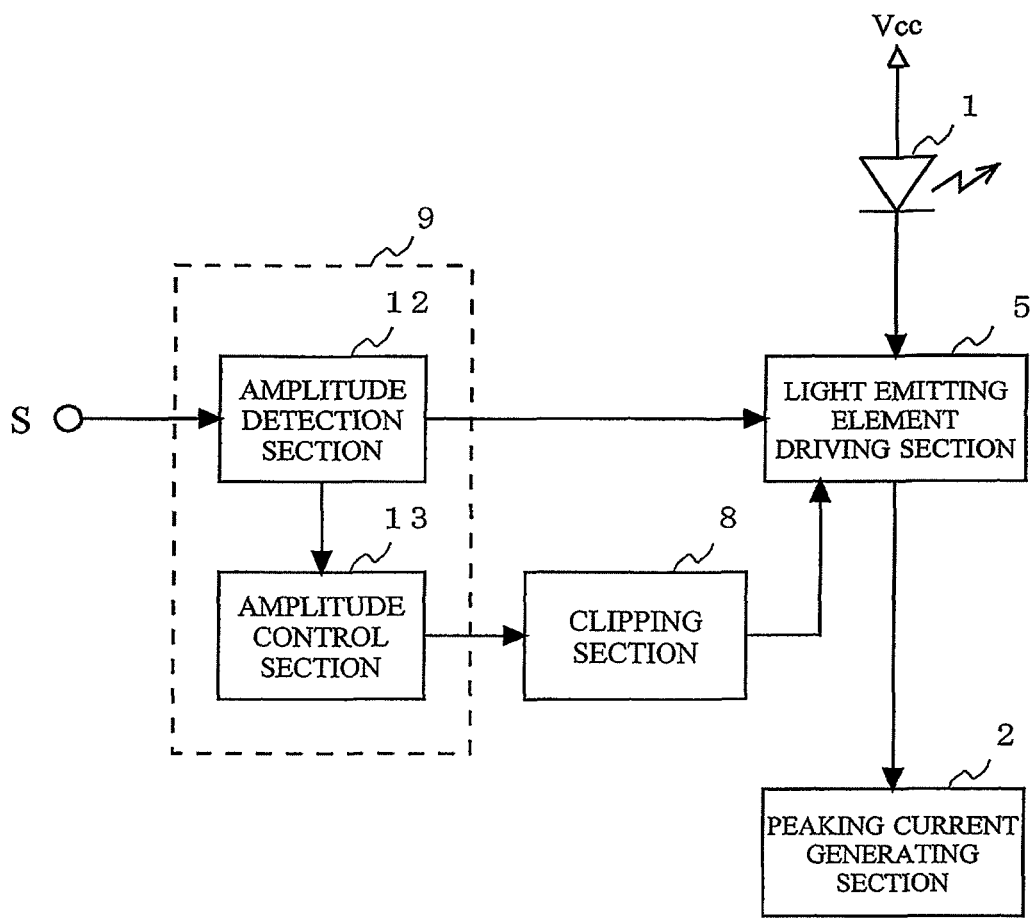
FIG. 13 shows, in detail, a configuration of an optical transmitter circuit according to a sixth embodiment of the present invention.

FIG. 13 shows a configuration of an optical transmitter circuit according to a sixth embodiment of the present invention. Referring to FIG. 13, the optical transmitter circuit of the sixth embodiment includes the light emitting element 1, the peaking current generating section 2, the light emitting element driving section 5, the clipping section 8, and the signal analysis section 9. The signal analysis section 9 includes an amplitude detection section 12 and an amplitude control section 13. The sixth embodiment differs from the first embodiment in the configurations of the amplitude detection section 12 and the amplitude control section 13. The optical transmitter circuit of the sixth embodiment will now be described while focusing on these configurations different from those of the first embodiment.

Figure 14:
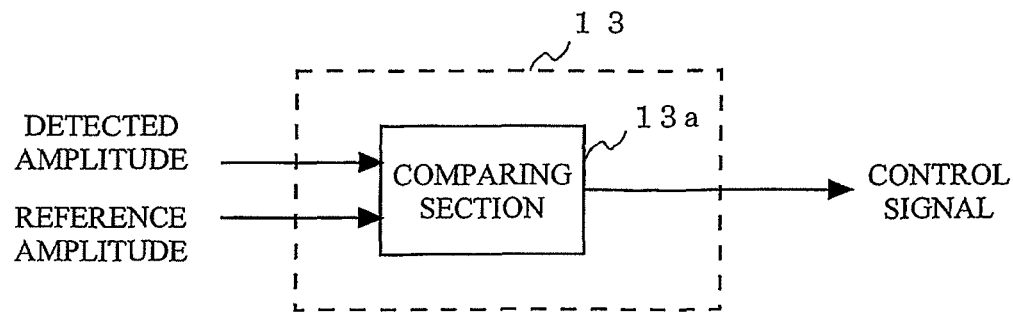
FIG. 14 is a detailed circuit diagram of an amplitude control section 13.

The amplitude detection section 12 outputs the received digital signal S to the light emitting element driving section 5, detects the amplitude of the digital signal S, and outputs the detection result to the amplitude control section 13 as the detected amplitude. The amplitude control section 13 includes a comparing section 13a, for example, as shown in FIG. 14, for comparing a predetermined reference amplitude with the detected amplitude to output a control signal based on the comparison result to the clipping section 8. Instead of the comparing section 13a, there may be provided a memory section storing various control signals so that one of the control signals is read out from the memory section according to the detected amplitude. The clipping section 8 varies the resistance value of the variable resistor R20 shown in FIG. 1 according to the control signal outputted from the amplitude control section 13 so as to adjust the amount of clipping so that the ratio of the clipping current amount with respect to the peaking current amount is less than or equal to a predetermined value.

For example, where the detected amplitude is larger than the reference amplitude, the peaking current occurring in the peaking current generating section 2 becomes large, whereby the bias current Ib of the clipping section 8 is increased. Where the detected amplitude is smaller than the reference amplitude, the bias current Ib of the clipping section 8 is decreased. Thus, it is possible to supply, to the light emitting element 1, a driving current with the clipping current amount a2 being adjusted to a value according to the amplitude of the digital signal S.

As described above, with optical transmitter circuit according to the sixth embodiment of the present invention, it is possible to automatically adjust the amount of clipping so that the ratio of the clipping current amount with respect to the peaking current amount is less than or equal to a predetermined value, according to the amplitude of the digital signal S, thus arriving at the minimum amount of clipping required for the amplitude. Thus, it is possible to realize a high response speed of the light emitting element 1 while reducing the power consumption.

Seventh Embodiment

FIG. 15 shows a configuration of an optical transmitter circuit according to a seventh embodiment of the present invention. Referring to FIG. 15, the optical transmitter circuit of the seventh embodiment includes the light emitting element 1, the peaking current generating section 2, the light emitting element driving section 5, the clipping section 8, and the signal analysis section 9. The signal analysis section 9 includes the pulse width detection section 10, the pulse width control section 11, the amplitude detection section 12, the amplitude control section 13, and an operation section 14. The configuration of the seventh embodiment is obtained by combining the first embodiment with the sixth embodiment, with the operation section 14 being the difference from the above embodiments. The optical transmitter circuit of the seventh embodiment will now be described while focusing on these configurations different from those of the above embodiments.

The operation section 14 adds together a control signal outputted from the pulse width control section 11 and a control signal outputted from the amplitude control section 13, and outputs the addition result to the clipping section 8 as the final control signal. Thus, it is possible to output a control signal according both to the transmission speed and to the amplitude of the digital signal S.

As described above, with the optical transmitter circuit according to the seventh embodiment of the present invention, it is possible to automatically adjust the amount of clipping so that the ratio of the clipping current amount with respect to the peaking current amount is less than or equal to a predetermined value, according both to the transmission speed and to the amplitude of the digital signal S, thus arriving at the minimum amount of clipping required for the transmission speed and the amplitude. Thus, it is possible to realize a high response speed of the light emitting element 1 while reducing the power consumption.

The process of detecting the transmission speed of the digital signal S and the process of detecting the amplitude of the digital signal S may be switched around. While the operation section 14 adds together the control signal from the pulse width control section 11 and the control signal from the amplitude control section 13, and outputs the addition result as the final control signal in the example described above, there may be provided a memory section storing various final control signals so that one of the final control signals is read out from the memory section according to various control signals.

Eighth Embodiment

Figure 16:
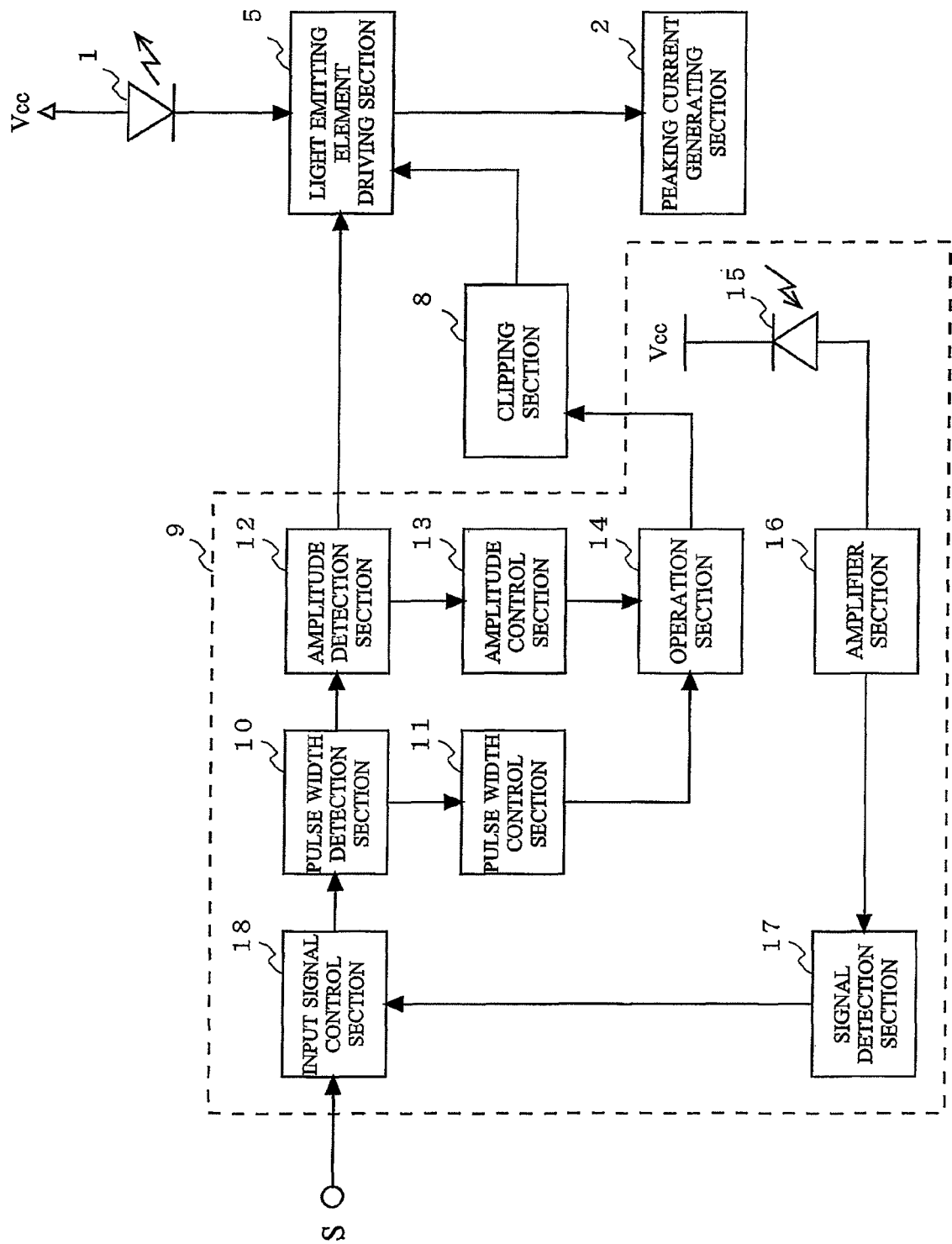
FIG. 16 shows, in detail, a configuration of an optical transmitter circuit according to an eighth embodiment of the present invention.

FIG. 16 shows a configuration of an optical transmitter circuit according to an eighth embodiment of the present invention. Referring to FIG. 16, the optical transmitter circuit of the eighth embodiment includes the light emitting element 1, the peaking current generating section 2, the light emitting element driving section 5, the clipping section 8, and the signal analysis section 9. The signal analysis section 9 includes the pulse width detection section 10, the pulse width control section 11, the amplitude detection section 12, the amplitude control section 13, the operation section 14, a light receiving element 15, an amplifier section 16, a signal detection section 17, and an input signal control section 18. The eighth embodiment differs from the seventh embodiment in the configurations of the light receiving element 15, the amplifier section 16, the signal detection section 17, and the input signal control section 18. The optical transmitter circuit of the eighth embodiment will now be described while focusing on these configurations different from those of the seventh embodiment.

The light receiving element 15 receives an optical signal from a communication unit (not shown) with which the optical transmitter circuit is communicating, and outputs an electrical signal according to the optical signal to the amplifier section 16. An antenna may be provided instead of the light receiving element 15, in which case the optical transmitter circuit receives a wireless signal from the communication unit. The amplifier section 16 amplifies the electrical signal from the light receiving element 15 with a predetermined gain. The signal detection section 17 detects the amplitude of the electrical signal amplified by the amplifier section 16, and outputs the detection result to the input signal control section 18 as the detected signal.

The input signal control section 18 includes, for example, a comparing section 18a and a variable gain amplifier 18b, as shown in FIG. 17. The comparing section 18a compares a predetermined reference signal with the detected signal to output a control signal based on the comparison result to the variable gain amplifier 18b as a gain control signal. The variable gain amplifier 18b controls the amplitude of the digital signal S according to the gain control signal. Any other suitable unit may be used instead of the variable gain amplifier 18b, as long as the amplitude of the digital signal S can be controlled. The digital signal S whose amplitude is controlled is inputted to the pulse width detection section 10.

For example, where the transmission distance is long and the optical signal received by the light receiving element 15 is small, the signal detection section 17 detects an amplitude smaller than the amplitude being the reference in the input signal control section 18, whereby the input signal control section 18 performs a control operation such that the amplitude of the digital signal S is increased. Based on the result, the bias current Ib of the clipping section 8 is increased. Where the transmission distance is short and the optical signal received by the light receiving element 15 is large, a control operation opposite to the above operation is performed.

As described above, with the optical transmitter circuit according to the eighth embodiment of the present invention, it is possible to automatically adjust the amount of clipping so that the ratio of the clipping current amount with respect to the peaking current amount is less than or equal to a predetermined value, according both to the transmission speed and to the amplitude of the digital signal S based on the distance to the communication unit over which signals are transmitted, thus arriving at the minimum amount of clipping required for the transmission speed and the amplitude. Thus, it is possible to realize a high response speed of the light emitting element 1 while reducing the power consumption.

Ninth Embodiment

Figure 18:
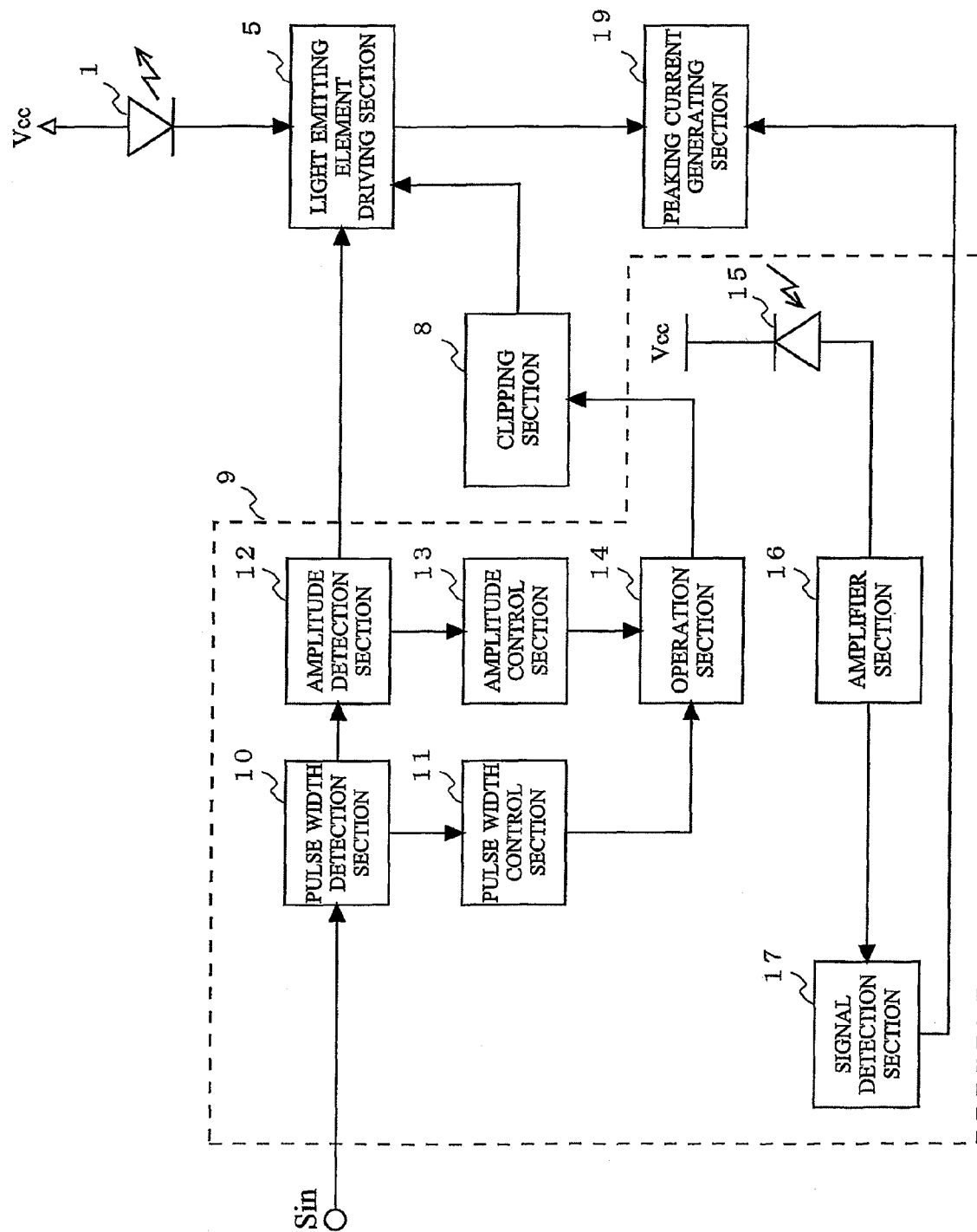
FIG. 18 shows, in detail, a configuration of an optical transmitter circuit according to a ninth embodiment of the present invention.

FIG. 18 shows a configuration of the optical transmitter circuit according to the ninth embodiment of the present invention. Referring to FIG. 18, the optical transmitter circuit of the ninth embodiment includes the light emitting element 1, the peaking current generating section 19, the light emitting element driving section 5, the clipping section 8, and the signal analysis section 9. The signal analysis section 9 includes the pulse width detection section 10, the pulse width control section 11, the amplitude detection section 12, the amplitude control section 13, the operation section 14, the light receiving element 15, the amplifier section 16, and the signal detection section 17. The ninth embodiment differs from the eighth embodiment in the configuration of the peaking current generating section 19. The optical transmitter circuit of the ninth embodiment will now be described while focusing on the configuration different from that of the eighth embodiment.

Figure 19:
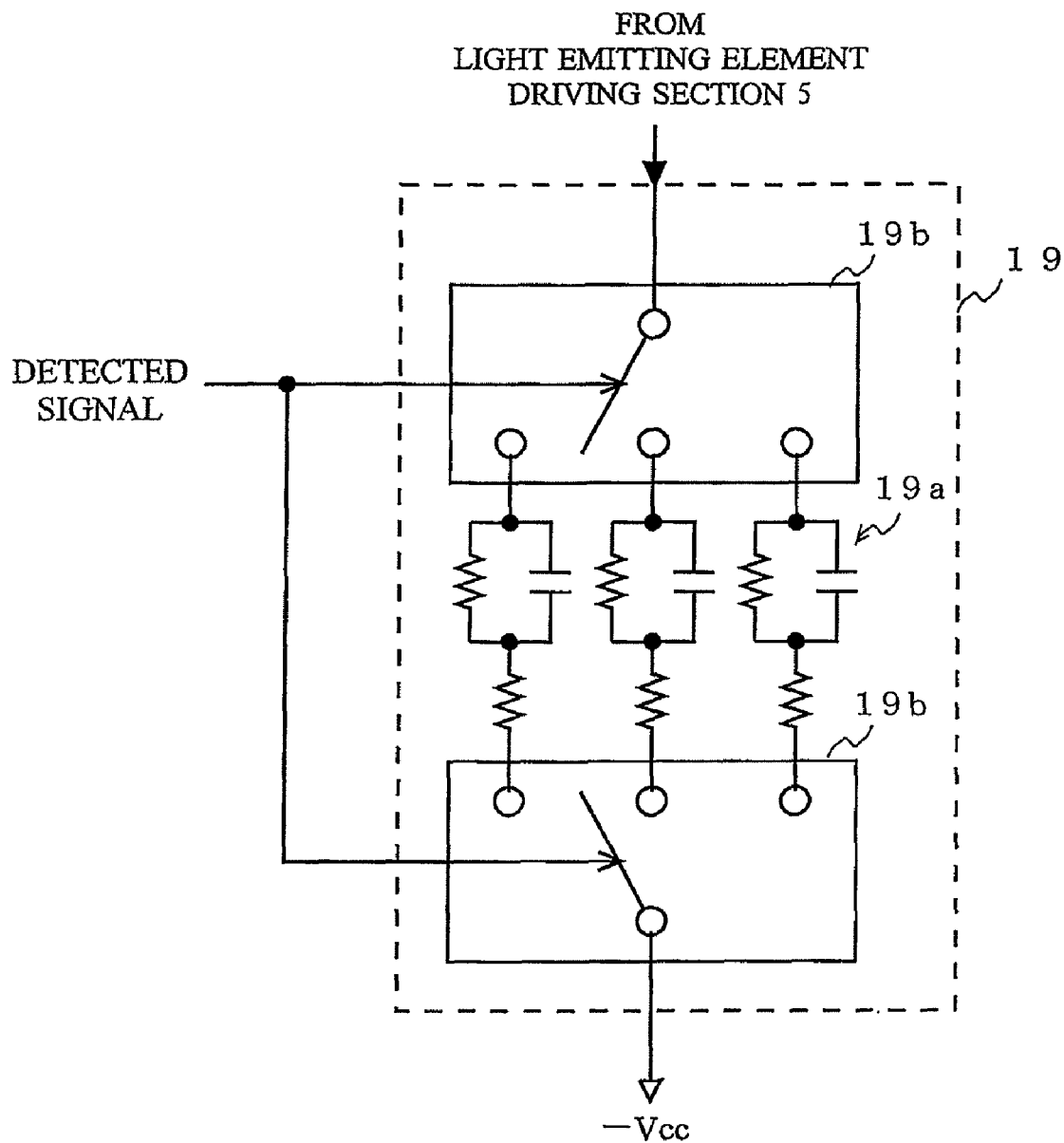
FIG. 19 is a detailed circuit diagram of a peaking current generating section 19.
Figure 21:
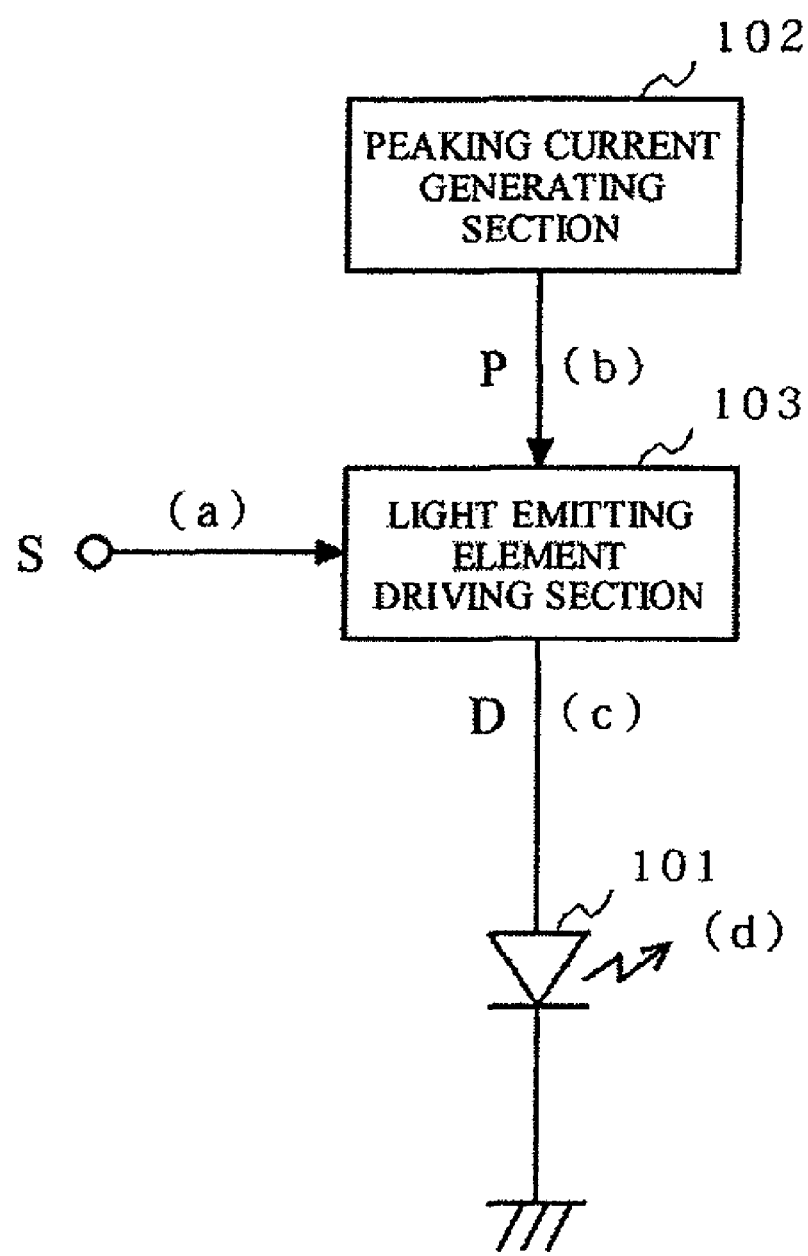
FIG. 21 is a functional block diagram showing a general configuration of a conventional light emitting element driving circuit.
Figure 22:
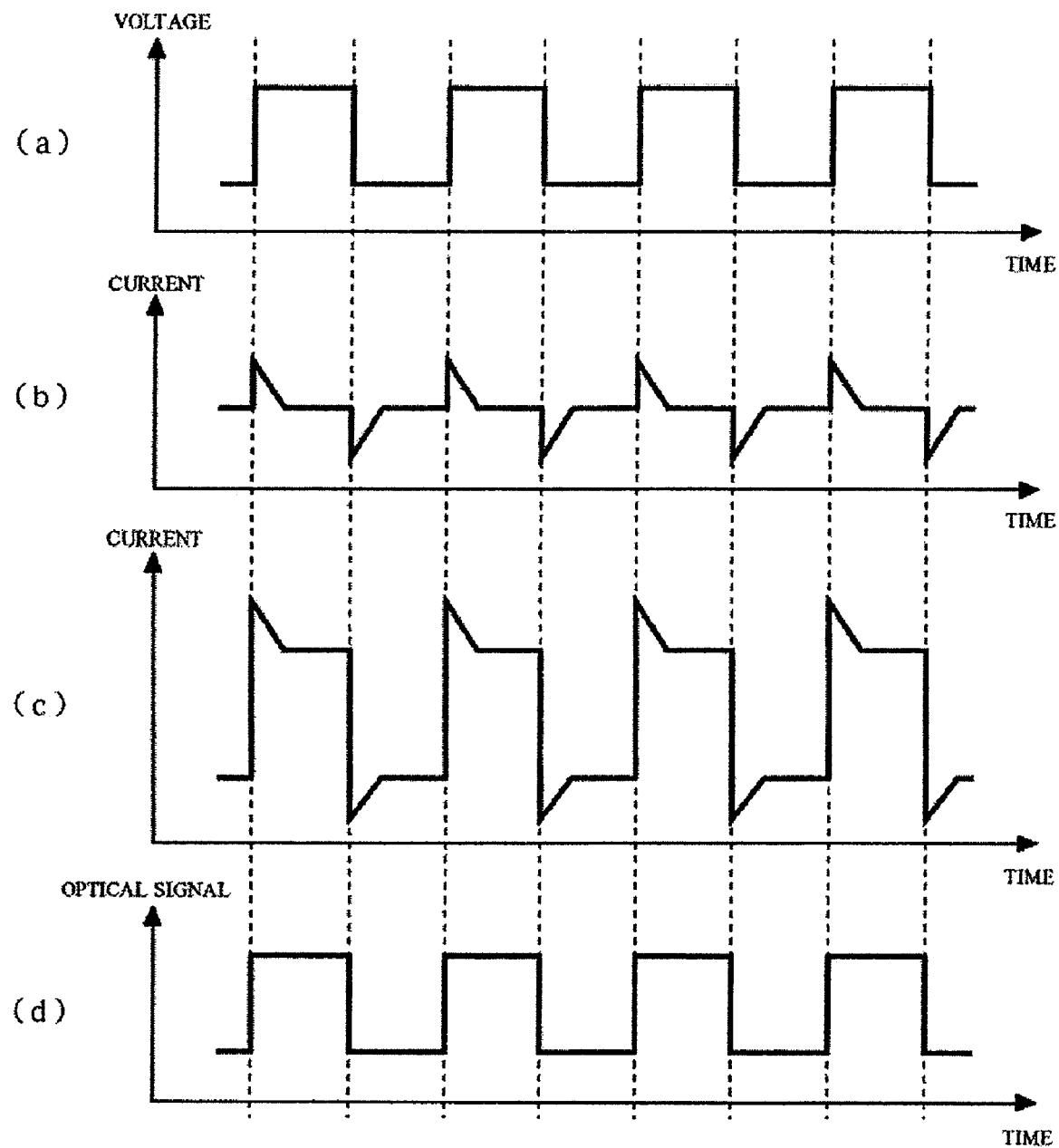
FIG. 22 shows waveform diagrams illustrating an operation of the light emitting element driving circuit shown in FIG. 21.

The signal detection section 17 detects the amplitude of the electrical signal amplified by the amplifier section 16, and outputs the detection result to the peaking current generating section 19 as the detected signal. The peaking current generating section 19 includes a plurality of waveform peaking sections 19a of different values and a selector section 19b, for example, as shown in FIG. 19. The selector section 19b selects one of the waveform peaking sections 19a of different values according to the detected signal.

As described above, with the optical transmitter circuit according to the ninth embodiment of the present invention, it is possible to automatically adjust the amount of clipping so that the ratio of the clipping current amount with respect to the peaking current amount is less than or equal to a predetermined value, according both to the transmission speed and to the amplitude of the digital signal S based on the distance to the communication unit over which signals are transmitted, thus arriving at the minimum amount of clipping required for the transmission speed and the amplitude. Thus, it is possible to realize a high response speed of the light emitting element 1 while reducing the power consumption.

It is understood that particular circuits of the first to ninth embodiments using resistors, capacitors and transistors are all illustrative, and each of them may be replaced by any other suitable circuit as long as the same function is provided. For example, in the clipping section 8, the variable resistor R20 may be replaced by a combination of a plurality of resistors of different resistance values and a selector switch, as shown in FIG. 20. If the input digital signal S is static, the resistance value of the variable resistor R20 may be fixed without detecting the pulse width or the amplitude of the digital signal S.

The sixth to ninth embodiments are each directed to the application of various possible configurations of the signal analysis section 9 to the optical transmitter circuit of the first embodiment. The various possible configurations of the signal analysis section 9 can similarly be applied to the optical transmitter circuits of the second to fifth embodiments to thereby achieve similar effects.

INDUSTRIAL APPLICABILITY

The optical transmitter circuit of the present invention can be used in a driving circuit, or the like, for driving a light emitting element for use in the field of optical communications, and is particularly suitable for cases where it is desirable to realize a high-speed operation of a light emitting element without lowering the reliability thereof.

The invention claimed is:

1. An optical transmitter circuit for driving a light emitting element according to a received digital signal, the optical transmitter circuit comprising:
   a peaking current generating section for generating a peaking current in synchronism with a rising edge and a falling edge of the digital signal;
   a light emitting element driving section, provided between the light emitting element and the peaking current generating section, for producing a driving current obtained by combining together a signal amplitude current according to an amplitude of the digital signal and the peaking current, so as to drive the light emitting element by using the driving current;
   a signal analysis section for analyzing the digital signal so as to set a control signal based on at least one of a pulse width and the amplitude of the digital signal; and
   a clipping section for clipping the peaking current of the driving current according to the control signal set by the signal analysis section,
   wherein the clipping section sets a ratio of a clipping current amount with respect to the peaking current amount to be less than or equal to a predetermined value.

2. The optical transmitter circuit according to claim 1, wherein the clipping section controls a bias current of the driving current produced by the light emitting element driving section.

3. The optical transmitter circuit according to claim 1, wherein the clipping section controls a power supply voltage supplied to the light emitting element.

4. The optical transmitter circuit according to claim 1, wherein the clipping section controls a voltage on a side closer to a terminal of the peaking current generating section to which the light emitting element driving section is not connected.

5. The optical transmitter circuit according to claim 1, wherein the signal analysis section includes:
   a pulse width detection section for detecting a pulse width of the digital signal; and
   a pulse width control section for setting a control signal according to the detected pulse width.

6. The optical transmitter circuit according to claim 1, wherein the signal analysis section includes:
   an amplitude detection section for detecting the amplitude of the digital signal; and
   an amplitude control section for setting a control signal according to the detected amplitude.

7. The optical transmitter circuit according to claim 1, wherein the signal analysis section includes:
   a pulse width detection section for detecting a pulse width of the digital signal;
   a pulse width control section for outputting a signal according to the detected pulse width;
   an amplitude detection section for detecting the amplitude of the digital signal;
   an amplitude control section for outputting a signal according to the detected amplitude; and
   an operation section for setting, as a control signal, a signal obtained by adding together the signal outputted from the pulse width control section and the signal outputted from the amplitude control section.

8. The optical transmitter circuit according to claim 7, wherein the signal analysis section further includes:
   a light receiving element for receiving an optical signal transmitted from a communication unit with which the optical transmitter circuit is communicating;
   an amplifier section for amplifying the signal received by the light receiving element;
   a signal detection section for detecting the amplitude of the signal amplified by the amplifier section; and
   an amplitude control section for controlling the amplitude of the digital signal inputted to the pulse width detection section based on a detection result of the signal detection section.

9. The optical transmitter circuit according to claim 7, wherein the signal analysis section further includes:

a light receiving element for receiving an optical signal transmitted from a communication unit with which the optical transmitter circuit is communicating;

an amplifier section for amplifying the signal received by the light receiving element; and a signal detection section for detecting the amplitude of the signal amplified by the amplifier section, wherein the peaking current generating section controls a peaking current amount to be generated based on a detection result of the signal detection section.

10. The optical transmitter circuit according to claim 1, wherein the peaking current generating section includes a first resistor and a second resistor connected in series with each other, and a capacitor connected in parallel to the first resistor.

11. The optical transmitter circuit according to claim 9, wherein the peaking current generating section includes a plurality of blocks, each block including a first resistor and a second resistor connected in series with each other, and a capacitor connected in parallel to the first resistor, and the blocks are switched from one to another based on a detection result of the signal detection section.

12. The optical transmitter circuit according to claim 1 wherein the light emitting element is provided within the optical transmitter circuit.

13. The optical transmitter circuit according to claim 1, wherein the light emitting element is an LED.

* * * * *